United States Patent
Yamamoto et al.

(10) Patent No.: US 9,242,172 B2
(45) Date of Patent: Jan. 26, 2016

(54) GAME CONTROL PROGRAM, GAME DEVICE, AND METHOD THAT MAKE GAME PROGRESS BY MOVING CHARACTER

(75) Inventors: Masami Yamamoto, Kanagawa (JP); Haruyuki Ohashi, Tokyo (JP); Satoru Koyama, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 588 days.

(21) Appl. No.: 13/391,705

(22) PCT Filed: Sep. 10, 2010

(86) PCT No.: PCT/JP2010/005534
§ 371 (c)(1),
(2), (4) Date: May 31, 2012

(87) PCT Pub. No.: WO2011/033747
PCT Pub. Date: Mar. 24, 2011

(65) Prior Publication Data
US 2012/0238357 A1    Sep. 20, 2012

(30) Foreign Application Priority Data

Sep. 15, 2009  (JP) .................................. 2009-213794
Nov. 12, 2009  (JP) .................................. 2009-258743

(51) Int. Cl.
*A63F 13/00* (2014.01)
*A63F 13/40* (2014.01)

(52) U.S. Cl.
CPC ........... *A63F 13/10* (2013.01); *A63F 2300/204* (2013.01); *A63F 2300/8094* (2013.01)

(58) Field of Classification Search
CPC ......... A63F 13/10; A63F 13/12; A63F 13/45; A63F 13/50; A63F 13/52; A63F 13/55; A63F 13/56; A63F 2300/8029; A63F 2300/807
USPC .................................................. 463/9, 29, 42
See application file for complete search history.

(56) References Cited

U.S. PATENT DOCUMENTS 6,629,887 B1 * 10/2003 Todaiji et al. ..................... 463/2
7,229,349 B2    6/2007 Yamada
(Continued)

FOREIGN PATENT DOCUMENTS

| JP | 2000167247 A | 6/2000 |
| JP | 2003325981 A | 11/2003 |

(Continued)

OTHER PUBLICATIONS

NPL document "Dig Dug".*
(Continued)

*Primary Examiner* — Allen Chan
(74) *Attorney, Agent, or Firm* — Matthew B. Dernier, Esq.

(57) ABSTRACT

A game device includes: an image processing unit operative to display a screen image of a game field including vertical land features; a passage forming unit operative to form a passage in the game field through which fluid can move, in accordance with an instruction by a user; fluid control unit operative to control fluid supplied to the passage; and a terrestrial character control unit and an aquatic character control unit operative to control an action of a character disposed in the game field. The aquatic character control unit moves the character, which exists in the passage in which the fluid exists, together with the fluid when the fluid is moved along the passage to a lower position by the fluid control unit.

9 Claims, 16 Drawing Sheets

(56) References Cited

U.S. PATENT DOCUMENTS

| | | | |
|---|---|---|---|
| 7,690,992 B2 | 4/2010 | Ito | |
| 8,002,633 B2 | 8/2011 | Shimizu | |
| 2003/0211877 A1 | 11/2003 | Yamada | |
| 2004/0152513 A1* | 8/2004 | Shimizu | 463/30 |
| 2006/0068905 A1* | 3/2006 | Umezaki | 463/30 |
| 2007/0066400 A1* | 3/2007 | Kogo | 463/42 |
| 2007/0213107 A1 | 9/2007 | Ito | |
| 2008/0287175 A1* | 11/2008 | Kusuda et al. | 463/17 |
| 2011/0287836 A1 | 11/2011 | Shimizu | |

FOREIGN PATENT DOCUMENTS

| | | |
|---|---|---|
| JP | 2004223110 A | 8/2004 |
| JP | 2006334289 A | 12/2006 |
| JP | 2007236813 A | 9/2007 |
| JP | 2008136693 A | 6/2008 |

OTHER PUBLICATIONS

International Search Report for corresponding PCT/JP2010/005534, dated Nov. 9, 2010.
International Preliminary Report on Patentability for corresponding PCT/JP2010/005534, dated Mar. 20, 2012.
OA for corresponding JP Patent Application No. 2009-213794, dated Nov. 2, 2010.
OA for corresponding JP Patent Application No. 2009-258743, dated Nov. 2, 2010.
OA for corresponding JP Patent Application No. 2009-213794, dated Mar. 22, 2011.
OA for corresponding JP Patent Application No. 2009-258743, dated Mar. 22, 2011.
"Pipe Dream 3D", 'Shukan Famitsu 6 Gatsu 28 Nichigo', Enterbrain, Inc., vol. 17, No. 26, p. 53, numbered pp. 1-5 are provided, Jun. 28, 2002. (See p. 6, of the Written Opinion as well as p. 2 of JP OA dated Nov. 2, 2010 for JP application No. 2009-213794 for relevance).
"Wii Koryaku DREAM Nintendo Dream 2007 Nen vol. 154 2 Gatsugo Tokubetsu Furoku 1", Mainichi Communications Inc., Dokuritsu Gyosei Hojin "Kogyo Shoyuken Joho-Kenshukan", p. 048 (paragraph of "8 Tsuro ni Mizu o Nagaso") pp. 1-5 are provided, received on Dec. 25, 2007. (See p. 7 of the Written Opinion as well as p. 2 of JP OA dated Nov. 2, 2010 for JP application No. 2009-213794 for relevance).
Yasunori Shiga, "Namuco, Ganso Anahori Game ga DS de Fukkatsu DS 'Dig Dug Digging Strike (Karl) ", [online], GAME Watch, Kabushiki Kaisha Impress Watch, Internet<URL; http://game.watch. impress.co.jp/ docs/20050610/dig.htm>, numbered pp. 105 are provided Jun. 10, 2005, [retrieval date Oct. 27, 2010] (Refer to the ISR for PCT/JP2010/005534 for relevancy).
Minoru Funatsu, "Action Puzzle 'Mr. Driller' Windows mo Seiha! Player no Jitsuryoku 0 Handan suru "Driller Shindan" 0 Arata ni Tsuika", [online], GAME Watch, Kabushiki Kaisha Impress Watch, Internet <URL: http://game.watch.impress.co.jp/docs/20001225/ namco.htm> numbered pp. 1-5 are provided, Dec. 25, 2000, retrieval date Oct. 27, 2010 (Refer to the ISR for PCT/JP2010/005534 for relevancy).
"Elvandia Story", 'Gemaga 2007 5 Gatsugo', Softbank Creative Corp., vol. 24, No. 5, p. 112 (paragraph of 'Route goto de, Onaji Kyara demo Teki Mikata ni') numbered pp. 1-5 are provided May 1, 2007. (See pp. 10 and 11 of the Written Opinion as well as p. 2-3 of the JP OA dated Nov. 2, 2010 for JP application No. 2009-258743 for relevance).
"Grand Theft Auto Vice City Stories", 'Famitsu Playstation+1 Gatsugo', Enterbrain, Inc., vol. 13, No. 1, p. 98 (paragraph of 'Sakki made no Teki ga Mikata ni naru!? Might of the Hunter'), pp. 1-5 are provided, Jan. 1, 2008, (See pp. 10 and 11 of the Written Opinion as well as pp. 2-3 of the JP OA dated Nov. 2, 2010 for JP application No. 2009-258743 for relevance).
Seiji Nakanura, "LAN Setsuzoku ni yoru Network Taisen ga Saidai no Miryoku NECI, 'Mr. Driller 2' o 3 Gatsu 29 Nichi ni Hatsubai", [online], GAME Watch, Kabushiki Kaisha Impress Watch, Internet<URL: http://game.watch.impress.co.jp/docs/20020307/mr. htm>, pp. 1-3 are provided, Mar. 7, 2002, retrieval date Oct. 27, 2010. (Refer to the ISR for PCT/JP2010/005534 for relevancy).

* cited by examiner

FIG.4

| POSITION | ENERGY | STATUS |
|---|---|---|
| (1, 1) | 16 | EARTH |
| : | : | : |
| (7, 1) | — | PASSAGE |
| : | : | : |
| (5, 4) | 27 | WATER |
| : | : | : |

| CHARACTER ID | CHARACTER TYPE | POSITION | ENERGY |
|---|---|---|---|
| 01 | FIRST TERRESTRIAL | (3, 6) | 24 |
| 02 | SECOND TERRESTRIAL | (5, 3) | 62 |
| 03 | THIRD TERRESTRIAL | (5, 7) | 105 |
| : | : | : | : |

62

60

62

GAME CONTROL PROGRAM, GAME DEVICE, AND METHOD THAT MAKE GAME PROGRESS BY MOVING CHARACTER

TECHNICAL FIELD

The present invention generally relates to game control technology, and more particularly, to game devices, methods, and programs that make a game progress by moving a character.

BACKGROUND ART

Simulation games where a user takes care of a character of the user and allow the character to combat an enemy character have gained popularity. The user takes care of a character of the user by using a variety of methods, increases a level, and makes the character win combat against an enemy character.

SUMMARY OF THE INVENTION

The present inventor attained an idea on technology for modifying such a game system and implementing a highly-developed game with a higher enjoyment level. In this background, a purpose of the present invention is to provide technology for implementing a game device having a higher enjoyment level.

According to an embodiment of the present invention, a computer program is provided. The computer program is embedded on a non-transitory computer-readable recording medium, and includes: a displaying module configured to display a screen image of a game field including vertical land features; a passage forming module configured to form a passage in the game field through which fluid can move, in accordance with an instruction by a user; a fluid control module configured to control fluid supplied to the passage; a character action control module configured to control an action of a character disposed in the game field; and a moving module configured to move the character, which exists in the passage in which the fluid exists, together with the fluid when the fluid is moved along the passage to a lower position by the fluid control module.

According to another embodiment of the present invention, a computer program is provided. The computer program is embedded on a non-transitory computer-readable recording medium, and includes: an allocating module configured to divide a game field into areas by the number of game devices that participate in a game, and configured to allocate respective areas to players of respective game devices; a character producing module configured to produce a character if a predetermined condition is satisfied in the game field; a defining module configured to define that the produced character belongs to a game device of a player to whom an area of the game field where the character has been produced is allocated; a combat control module configured to control combat between the character and an enemy character; and a profit supplying module configured, when the character defeats the enemy character, to supply profit to a player of a game device to which the character belongs.

According to the present invention, technology for implementing a game device having a higher enjoyment level can be provided.

BRIEF DESCRIPTION OF THE DRAWINGS

FIG. 4 shows an example of internal data of a field table;

FIG. 5 shows an example of internal data of a character table;

DETAILED DESCRIPTION OF THE INVENTION

The game device according to an embodiment provides a game of which a purpose is to allow a character of a user to fight against and defeat an enemy character on a game field including vertical land features. A user can form a passage in a game field through which a character can move, and can produce a character of the user. A character moves autonomously under the control of artificial intelligence, and when encountering an enemy character, combats the character. Although a user cannot control the character directly, since some characters move along with the flow of water, the user can move the characters indirectly by forming a passage and by allowing water to move.

Figure 1:
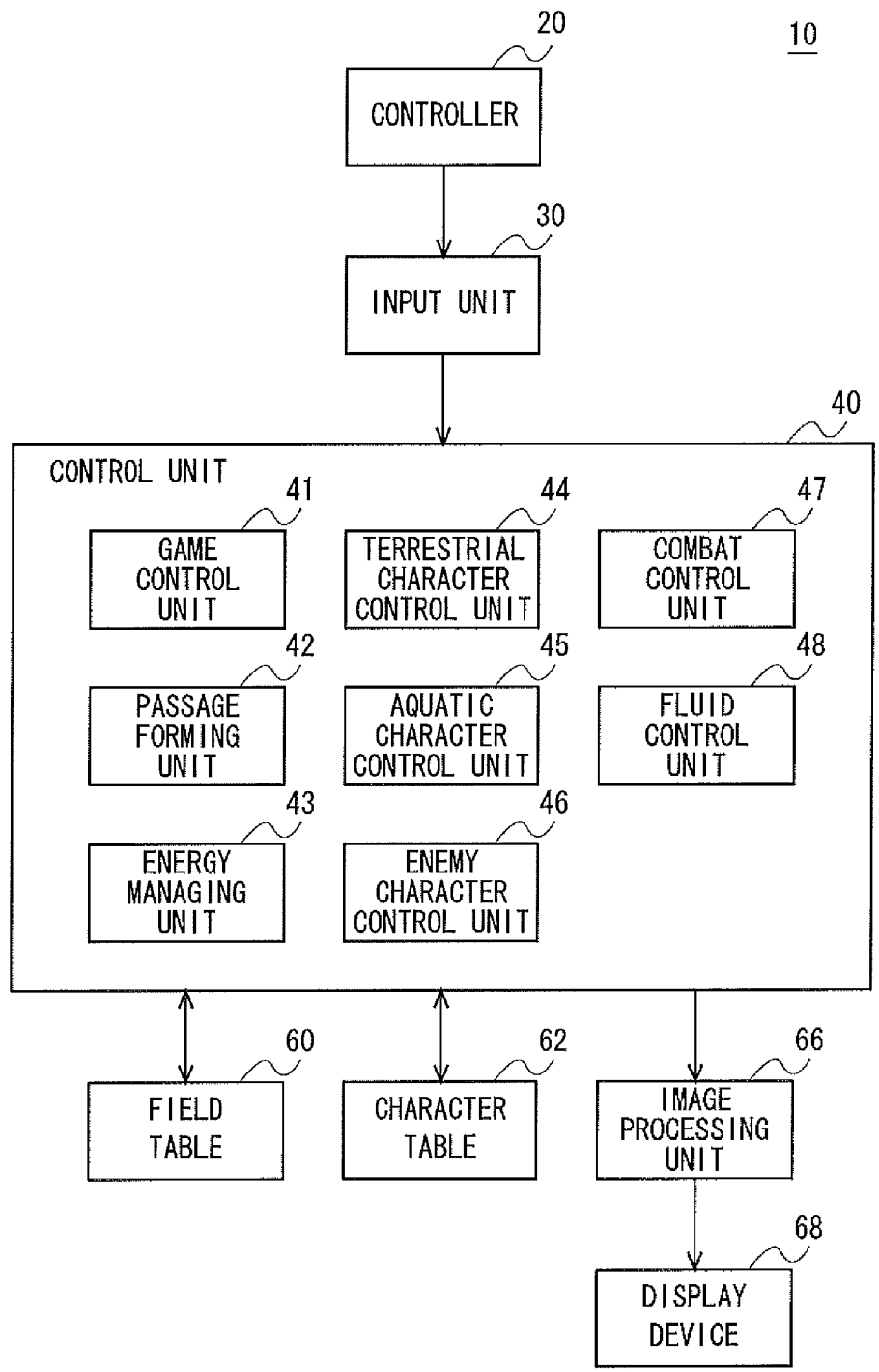
FIG. 1 shows a structure of a game device according to a first embodiment.

FIG. 1 shows a structure of a game device 10 according to the embodiment. The game device 10 comprises a controller 20, an input unit 30, a control unit 40, a field table 60, a character table 62, an image processing unit 66, and a display device 68. Those constituent elements are implemented by a CPU of a computer, memory, a program loaded into the memory, or the like in terms of hardware components. FIG. 1 depicts functional blocks implemented by cooperation of these components. Therefore, it will be obvious to those skilled in the art that the functional blocks may be implemented in a variety of ways, by hardware only, software only, or a combination thereof.

The input unit 30 receives a control signal that is input from the controller 20 operated by a player. The control unit 40, based on the instruction received by the input unit 30 from the user, executes a game program that is read out from a recording medium (not shown) and makes a game progress. The field table 60 retains information relating to a game field. The character table 62 retains parameters representing attributes of a character, or the like. The image processing unit 66 generates a screen image of the game that is controlled by the control unit 40, and allows the display device 68 to display the screen image. The details on the operation of respective structures will be given in the following explanation.

Figure 2:
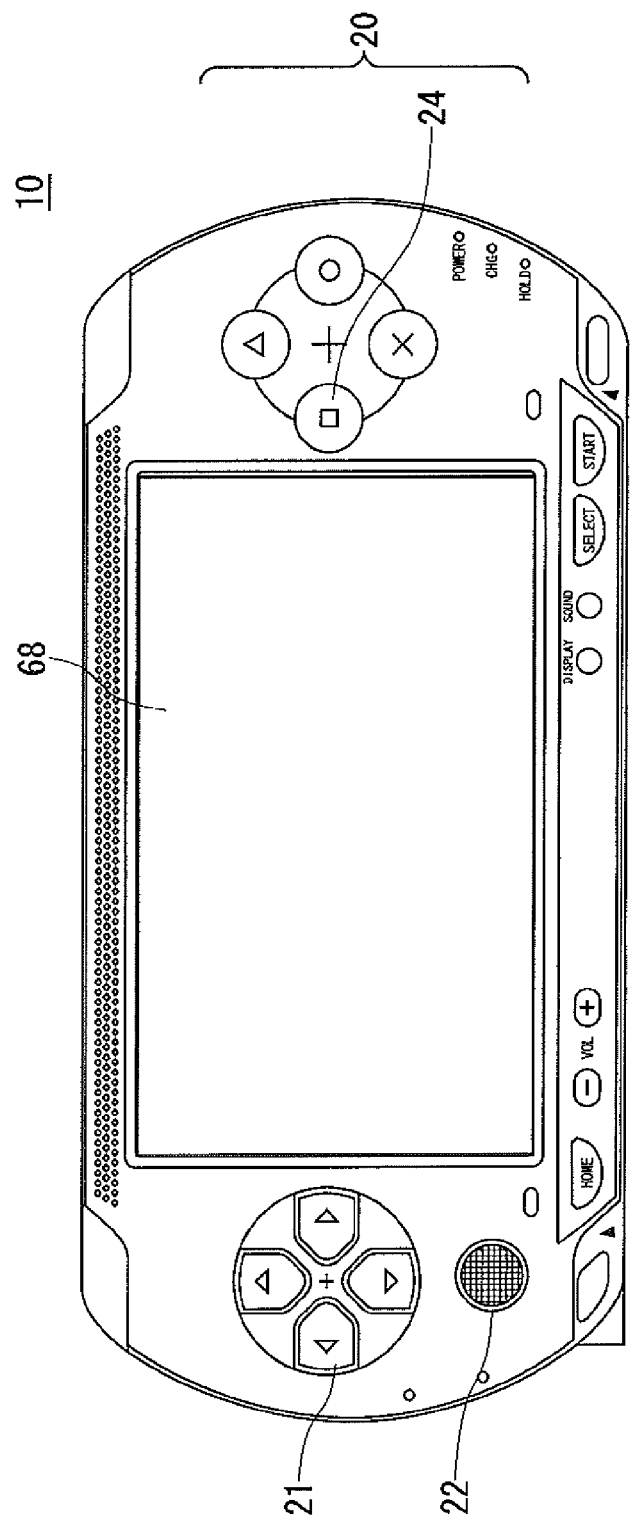
FIG. 2 shows an external view of the game device according to the first embodiment.

FIG. 2 shows an external view of the game device 10 according to the embodiment. On the front surface of the game device 10, the display device 68 and the controller 20 are provided. The controller 20 includes directional keys 21, an analogue pad 22, and a button 24. To the directional keys 21 and to the analogue pad 22, a function for moving a cursor is allocated, and to the button 24, a function for excavating earth at a current position of the cursor so as to form a passage is allocated, respectively.

Figure 3:
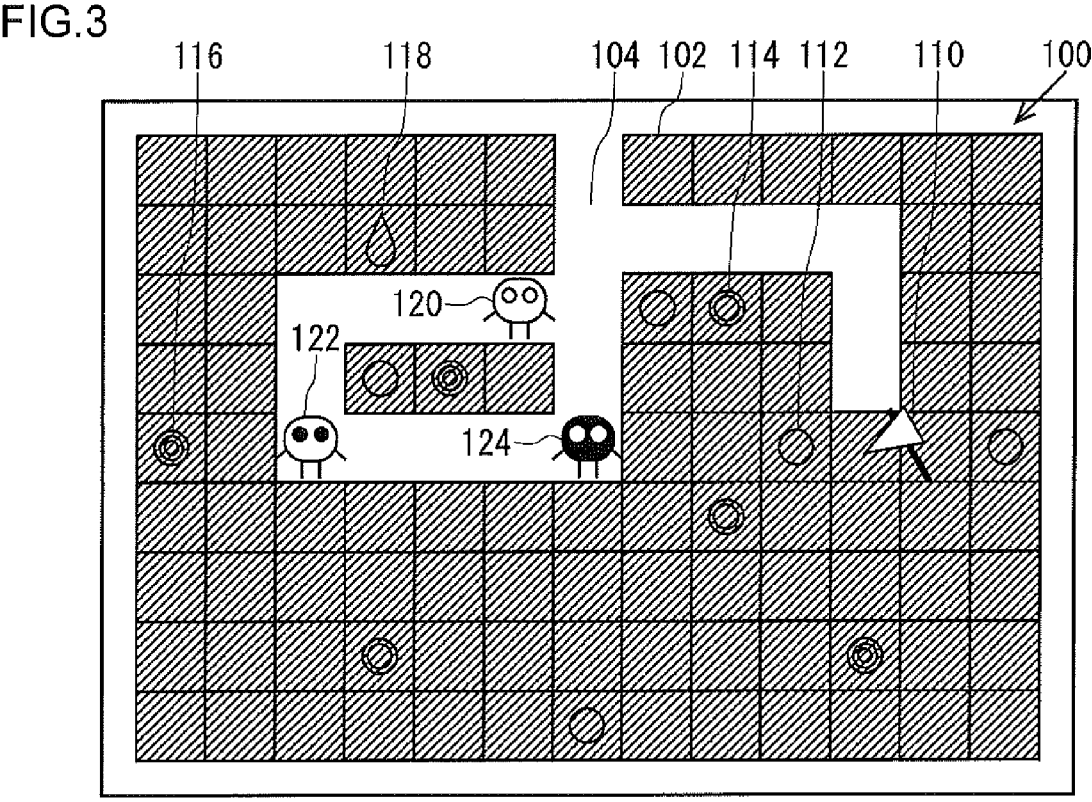
FIG. 3 shows an exemplary screen image of a game provided by the game device.

FIG. 3 shows an exemplary screen image of the game provided by the game device 10 according to the embodiment. On the game screen image, a game field (dungeon) 100 including vertical land features is displayed. On the game field 100, a pickax-shaped cursor 110, which can be operated by the user, is displayed. The user can move the cursor 110 up, down left or right, can excavate earth 102 existing at the current position of the cursor 110, the earth 102 constituting the game field 100, and can form a passage 104 through which a character and water can move.

In the earth 102, energy, which can be a source of the activity of a character, is accumulated as a nutrient. At a position where the energy is more than or equal to a first threshold value and less than a second threshold value (hereinafter, referred to as a "first level"), a first graphic symbol 112 that indicates a nutrient is at the first level is displayed. At a position where the energy is more than or equal to the second threshold value and less than a third threshold value (hereinafter, referred to as a "second level"), a second graphic symbol 114 that indicates a nutrient is at the second level is displayed. At a position where the energy is more than or equal to the third threshold value (hereinafter, referred to as a "third level"), a third graphic symbol 116 that indicates a nutrient is at the third level is displayed. In addition, at a position where an item for supplying water into the passage 104 is provided, a graphic symbol 118 indicating thereof is displayed as will be described later.

In the passage 104, a plurality of types of characters are disposed. These characters are produced by excavating the earth 102, which accumulates energy as will be described later. Displayed in FIG. 3 are a first terrestrial character 120, which emerges from earth 102 that accumulates first level energy, a second terrestrial character 122, which emerges from earth 102 that accumulates second level energy, and a third terrestrial character 124, which emerges from earth 102 that accumulates third level energy. These characters move autonomously and combat an enemy character.

FIG. 4 shows an example of internal data of a field table 60. The field table 60 is provided with a position field 71, an energy field 72, and a status field 73. The position field 71 stores coordinates indicating a position in the game field. As shown in FIG. 3, the game field is divided into rectangular blocks of predetermined size, and the game field is managed for each block as a unit. The energy field 72 stores a value of energy accumulated in a block. The status field 73 stores a status of a block. The statuses of the blocks include earth, a passage, water, or the like.

FIG. 5 shows an example of internal data of a character table 62. Provided in the character table 62 are a character ID field 75, a character type field 76, a position field 77, and an energy field 78. The character ID field 75 stores the ID of a character disposed in the game field. The character type field 76 stores the type of the character. The types of characters includes, a first terrestrial character, a second terrestrial character, a third terrestrial character, a first aquatic character, a second aquatic character, a third aquatic character, a boss character, an enemy character, or the like. The position field 77 stores the current coordinates of the character. The energy field 78 stores energy retained by the character.

An explanation on the structure of each element will be continued while referring back to FIG. 1. The game control unit 41 controls the progress of a game. If a predetermined time period has been passed after starting a game, the game control unit 41 disposes a boss character and one or more enemy characters in the game field. As will be described later, the user builds up the game field so as to produce characters of the user, of which the number is enough to protect the boss character and to defeat the enemy characters. If all the enemy characters disposed in the game field are defeated by the characters of the user, the game control unit 41 gives points to the user and terminates the game. If the boss character is taken away from the game field by an enemy character, the game control unit 41 determines that the game is over.

The passage forming unit 42 forms a passage in the game field in accordance with an instruction by the user. The passage forming unit 42 retains coordinates indicating a current position of the cursor, and if one or more of the directional keys 21 or the analogue pad 22 of the controller 20 acknowledges an instruction input by the user, the passage forming unit 42 moves the cursor in a instructed direction included in up, down left or right. If the button 24 of the controller 20 acknowledges an input, the passage forming unit 42 excavates earth at a current position of the cursor so as to form a passage. In this process, the passage forming unit 42 replaces "earth" status of the status field 73 of the current cursor position with "a passage" status in the field table 60.

The energy managing unit 43 manages the increase and the decrease of parameters, which represent energy for producing the characters, for allowing characters to act, etc. The energy managing unit 43 defines energy for respective blocks in the game field when a game is started and stores the defined energy into the energy field 72 of the field table 60. As will be described later, the energy managing unit 43 increases or decreases energy of a character or energy of the game field when a character sucks energy accumulated in the game field, when a character gives energy to the game field, etc. Further, the energy managing unit 43 increases the energy of a character when the character defeats an enemy character, when the character catches and eats another character, etc. The energy managing unit 43 may move energy accumulated in earth adjacent to a passage in which water exists from the earth to the water.

The fluid control unit 48 controls fluid supplied into a passage. When the game field is excavated and a passage is formed by the passage forming unit 42, if an item that produces water is provided in the game field at the excavated position, the fluid control unit 48 produces water at the position where the item is provided, and controls the flow of produced water. The fluid control unit 48 calculates the flow of water using a predetermined algorithm and replaces "a passage" status of the block where water exists in the status field 73 with "water" status in the field table 60. An explanation on the algorithm for controlling the flow of water will be described later.

The terrestrial character control unit 44 controls a terrestrial character produced in a passage where water does not exist. When the game field is excavated and a passage is formed by the passage forming unit 42, if energy equal to or more than the first level is accumulated in earth at the excavated position, the terrestrial character control unit 44 produces a terrestrial character in accordance with the accumulated energy. The terrestrial character control unit 44 produces a first terrestrial character if the accumulated energy is equal to or more than the first level and less than the second level, produces a second terrestrial character if the accumulated energy is equal to or more than the second level and less than the third level, and produces a third terrestrial character if the accumulated energy is equal to or more than the third level. After producing a terrestrial character, the terrestrial character control unit 44 enters information on the produced terrestrial character in the character table 62.

The terrestrial character control unit 44 automatically determines the action of a terrestrial character by the artificial intelligence in accordance with the energy of the terrestrial character, status surrounding the character, or the like, and allows the character to act, accordingly. The terrestrial character control unit 44 selects next action of the terrestrial character at a predetermined timing. The terrestrial character control unit 44 may select the action of the terrestrial character for each frame of game screen image that is generated by the image processing unit 66, or may select the action of the terrestrial character for every predetermined number of frames.

The terrestrial character control unit 44 normally selects the next action of the terrestrial character from following alternatives: moving upward; moving downward; moving rightward; moving leftward; and not moving. The terrestrial character control unit 44 may first acquire a direction in which the terrestrial character can move by referring to the field table 60 before selecting the action of the terrestrial character, and may select the action accordingly. Alternatively, the terrestrial character control unit 44 may first select the next action of the terrestrial character, then may refer to the field table 60 to check whether the character can move in the selected direction, and if the character can not move in the selected direction, may select another action newly. The terrestrial character control unit 44 moves the character in the determined direction and updates the position field 77 of the character table 62. After allowing the terrestrial character to move, the terrestrial character control unit 44 may instruct the energy managing unit 43 to subtract predetermined energy.

If a character which a terrestrial character can catch and eat exists in a block adjacent to a block in which the terrestrial character exists, the terrestrial character control unit 44 adds the action of catching and eating the character as an option for determining the next action. If the action of catching and eating the character is selected, the terrestrial character control unit 44 increases a value in the energy field 78 of the character that has caught and eaten another character in the character table 62, and deletes information on the character that has been caught and eaten from the character table 62. The terrestrial character control unit 44 may give energy which the character that has been caught and eaten had to the character that has caught and eaten, or may give energy of a predetermined value to the character that has caught and eaten. The terrestrial character control unit 44 may be configured so that a character can not only catch and eat another character but can also catch and eat a nutrient (energy) accumulated in an adjacent earth block. The terrestrial character control unit 44 may instruct the energy managing unit 43 to give energy which a terrestrial character has to an adjacent earth block.

If the energy of a terrestrial character exceeds a predetermined value, the terrestrial character control unit 44 produces a new character from the terrestrial character so as to propagate characters. The terrestrial character control unit 44 may produce a same type of terrestrial character or may produce another type of terrestrial character. The terrestrial character control unit 44 may produce a predetermined type of character, or may select a type of a character to be produced randomly. The terrestrial character control unit 44 may produce a plurality of characters at the same time. After producing a new character, the terrestrial character control unit 44 enters information on the newly produced character in the character table 62.

If the energy of a terrestrial character dips below a predetermined value, the terrestrial character control unit 44 deletes the terrestrial character and gives the energy which the terrestrial character retained to a surrounding game field (blocks of earth). The terrestrial character control unit 44 deletes information on the terrestrial character to be extinguished from the character table 62, and instructs the energy managing unit 43 to supply energy which the terrestrial character had to a game field adjacent to a current position of the terrestrial character.

In this manner, the terrestrial character control unit 44 simulates an ecological system of terrestrial characters. Even if only a specific type of terrestrial characters are produced in abundance, the terrestrial characters can not reproduce themselves and its number is decreased if characters which the specific type of terrestrial characters can catch and eat are few in number. Therefore, a user has to produce characters including characters which can be caught and eaten in a balanced manner.

If an enemy character exists in a block adjacent to a block in which a terrestrial character exists, the terrestrial character control unit 44 adds the action of combating the enemy character as an option for determining the next action. The terrestrial character control unit 44 may determine that a terrestrial character always starts combat when the terrestrial character is positioned next to an enemy character. Combat between a terrestrial character and an enemy character is controlled by a combat control unit 47.

The aquatic character control unit 45 controls an aquatic character produced in a passage where water exists. If energy accumulated in earth adjacent to a passage in which water exists reaches a predetermined value, the aquatic character control unit 45 produces an egg of an aquatic character based on the level of energy and disposes the egg in the passage in which water exists. If a user pecks the egg with a pickax, that is, if the user positions the cursor on a block where the egg is disposed and pushes the button 24, the aquatic character control unit 45 produces an aquatic character. Main functions of the aquatic character control unit 45 are similar as those of the terrestrial character control unit 44.

The aquatic character control unit 45 may define that an aquatic character can catch and eat energy as a nutrient solved in water, or that an aquatic character can takes in energy as a nutrient accumulated in earth. The aquatic character control unit 45 may control an aquatic character so as not to move to a passage in which water does not exist, or may subordinate a selection option of the action of moving to a passage in which water does not exist to other selection options. The aquatic character control unit 45 may control an aquatic character so as to consume more energy when moving in a passage in which water does not exist than when moving in a passage in which water exists.

When the fluid control unit 48 allows water in a passage in which an aquatic character exists to flow, the aquatic character control unit 45 moves the aquatic character along with the water. The aquatic character control unit 45 refers to the character table 62 and acquires the position of a block where an aquatic character exists. When the fluid control unit 48 allows water to move, the aquatic character control unit 45 refers to the field table 60 and acquires the destination position of the movement of the water, and updates the position field of the character table 62 in a similar manner. Thereby, a user can move aquatic characters indirectly by forming a passage and by allowing water to move. The terrestrial characters may not be moved along with water.

An enemy character control unit 46 controls an enemy character disposed in the game field. If an enemy character comes at a block adjacent to a block in which a boss character is disposed, the enemy character control unit 46 allows the enemy character to capture the boss character and makes the boss character to move with the enemy character after the capture. After the enemy character captures the boss character, the enemy character control unit 46 may control the enemy character so that the enemy character moves towards a port opening of the game field. For example, the enemy character control unit 46 may retain in memory a path which the enemy character passes through from the port opening of the game field to the position of the boss character, may calculate a shortest path to the port opening based on the stored pathway, and may move the enemy character so as to pass through the calculated shortest path. When selecting next action of the enemy character, the enemy character control unit 46 may select an upward movement preferentially. In case that the port opening of the game field is provided near the center of top end of the game field, an leftward movement may be preferentially selected if the character exists in the right half of the game field, and an rightward movement may be preferentially selected if the character exists in the left half of the game field. As described above, if the enemy character arrives at the port opening of the game field while accompanying the boss character, the game will be over.

The enemy character control unit 46 is configured to be able to select a magic as an action of an enemy character, the magic making water that exists in the game field freeze so as not to be able to move. If the enemy character control unit 46 allows an enemy character to perform a magic spell that freezes water, and the fluid control unit 48 prohibits water from moving until the magic spell is discharged. The fluid control unit 48 may discharge the magic spell when a predetermined time period passes, or may discharge the magic spell when a predetermined condition is satisfied, for example when an aquatic character performs a magic spell that melts ice. The aquatic character control unit 45 may not generate a new egg of an aquatic character during a time period when water is frozen into ice and remains frozen.

The combat control unit 47 controls combat between a character of a user and an enemy character. The combat control unit 47 reads out the type of the character of the user and the type of the enemy character from the character table 62, reads out the attributes of those characters from a character database (not shown), and controls the combat between those characters. The combat control unit 47 may determine victory or defeat from the attributes of both characters, or may read out options of actions that both characters can select in combat from the character data base, may simulate combat between the characters by artificial intelligence, and may determine victory or defeat, accordingly. The combat control unit 47 may read out energy of both characters from the character table 62, and may determine victory or defeat based on the energy.

Next, an explanation will be given on operations of respective constituent elements while referring to game screen images provided by the game device 10.

Figure 6:
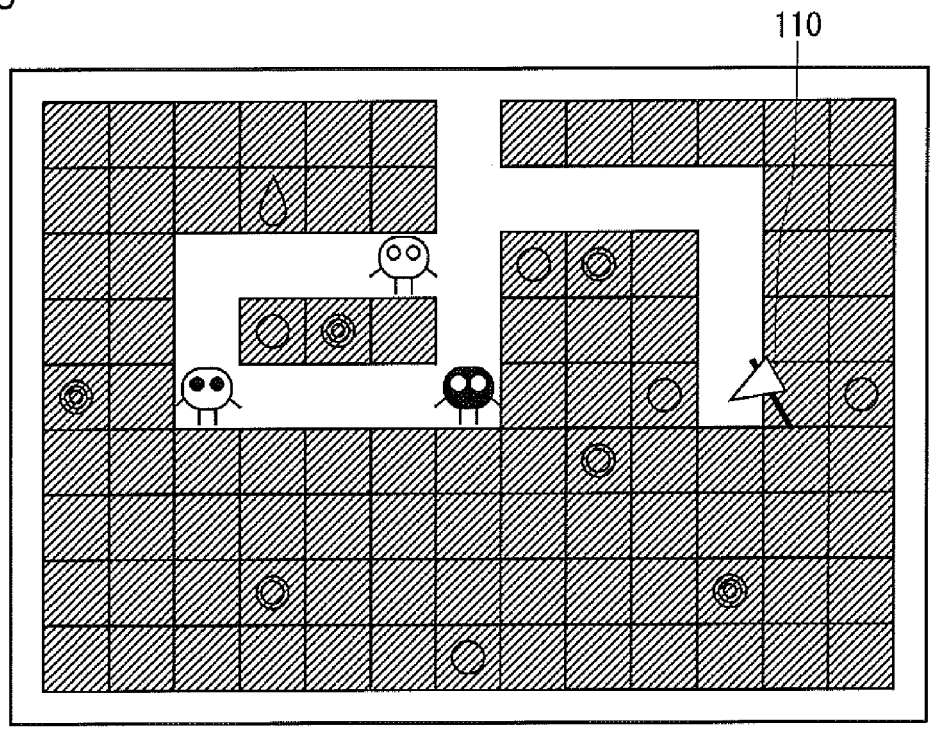
FIG. 6 shows an exemplary screen image of the game provided by the game device.

FIG. 6 shows an exemplary screen image of the game provided by the game device 10. If a user pushes the button 24 when the screen image shown in FIG. 3 is displayed, the passage forming unit 42 allows the image processing unit 66 to display an appearance where earth at a current position of the cursor 110 is excavated and formed into a passage, and replaces "earth" status of the status field 73 of a current position of the cursor 110 with "a passage" status in the field table 60. The screen image of this process is shown in FIG. 6.

Figure 7:
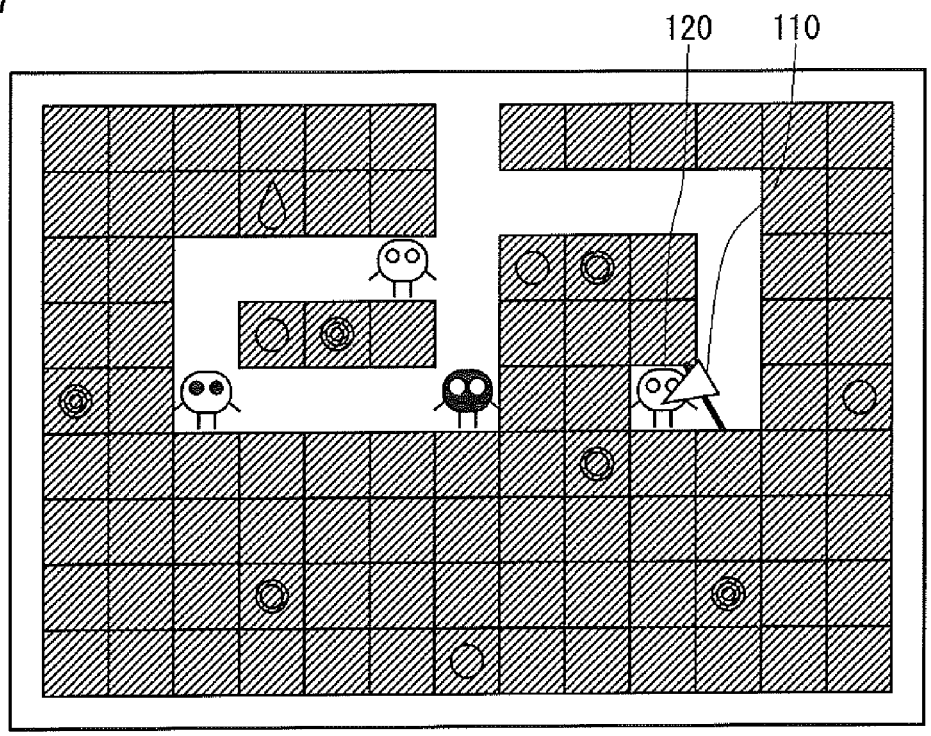
FIG. 7 shows an exemplary screen image of the game provided by the game device.

FIG. 7 shows an exemplary screen image of the game provided by the game device 10. If a user moves the cursor 110 leftward for one block, and pushes the button 24 when the screen image shown in FIG. 6 is displayed, the passage forming unit 42 allows the image processing unit 66 to display an appearance where earth at a current position of the cursor 110 is excavated and formed into a passage, and replaces "earth" status of the status field 73 of the current position of the cursor 110 with "a passage" status in the field table 60. In this process, since energy of the first level is accumulated in earth at the excavated position, the terrestrial character control unit 44 produces a first terrestrial character 120 at the position of a block that is excavated. The screen image of this process is shown in FIG. 7.

Figure 8:
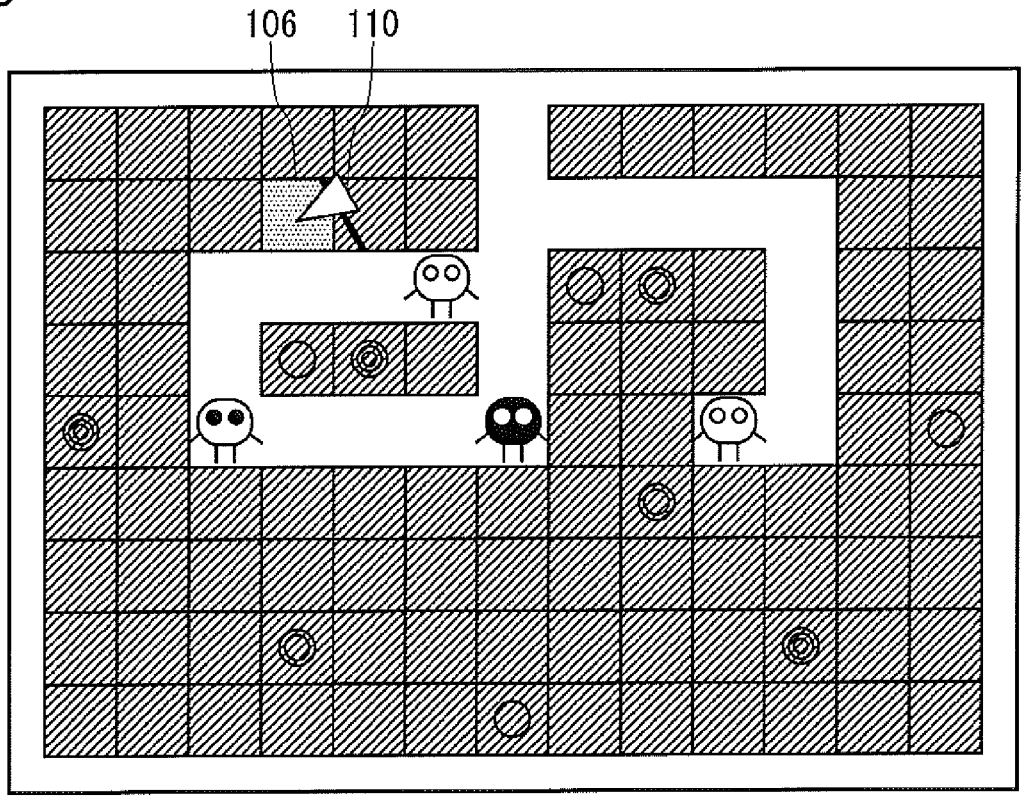
FIG. 8 shows an exemplary screen image of the game provided by the game device.

FIG. 8 shows an exemplary screen image of the game provided by the game device 10. If a user moves the cursor 110 on a block where a graphic symbol 118 is displayed, the symbol 118 indicating that an item for producing water is disposed, and if the user pushes the button 24, the passage forming unit 42 allows the image processing unit 66 to display an appearance where earth at a current position of the cursor 110 is excavated and formed into a passage, and replaces "earth" status of the status field 73 of the block of a current position of the cursor 110 with "a passage" status in the field table 60. In this process, the fluid control unit 48 produces water 106 at the position of the excavated block. The screen image of this process is shown in FIG. 8.

Figure 9:
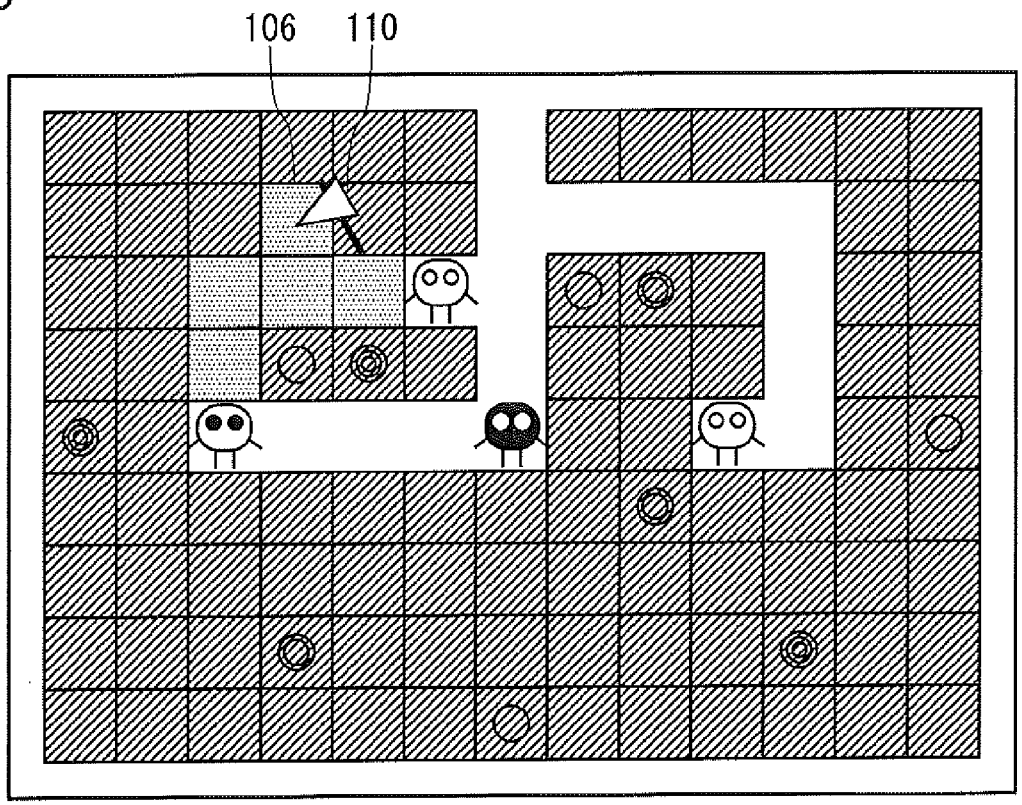
FIG. 9 shows an exemplary screen image of the game provided by the game device.

FIG. 9 shows an exemplary screen image of the game provided by the game device 10. The fluid control unit 48 produces a predetermined amount of water at the position of the excavated block. In this example, it is assumed that an amount of water 106 that fills nine blocks of passage is produced. The fluid control unit 48 determines the status of movement of the water 106 at a predetermined timing and allows the image processing unit 66 to display. First, the fluid control unit 48 replaces the status of the block at the position where water 106 is produced in the status field 73 with "water" status in the field table 60. Next, the fluid control unit 48 checks the status of a lower block that is under the block where water is produced, and if the status is "a passage", moves water to the lower block. If the status of the lower block is "earth", the fluid control unit 48 checks the statuses of left and right blocks, and if the status of one of the blocks is "a passage", the fluid control unit 48 moves water to the block. In case that the statuses of both left and right blocks are "a passage", the fluid control unit 48 may move water, for example to the left block preferentially, or may move water to left and right blocks alternately, so that water flows divergingly. The screen image when five blocks of water is produced is shown in FIG. 9.

Figure 10:
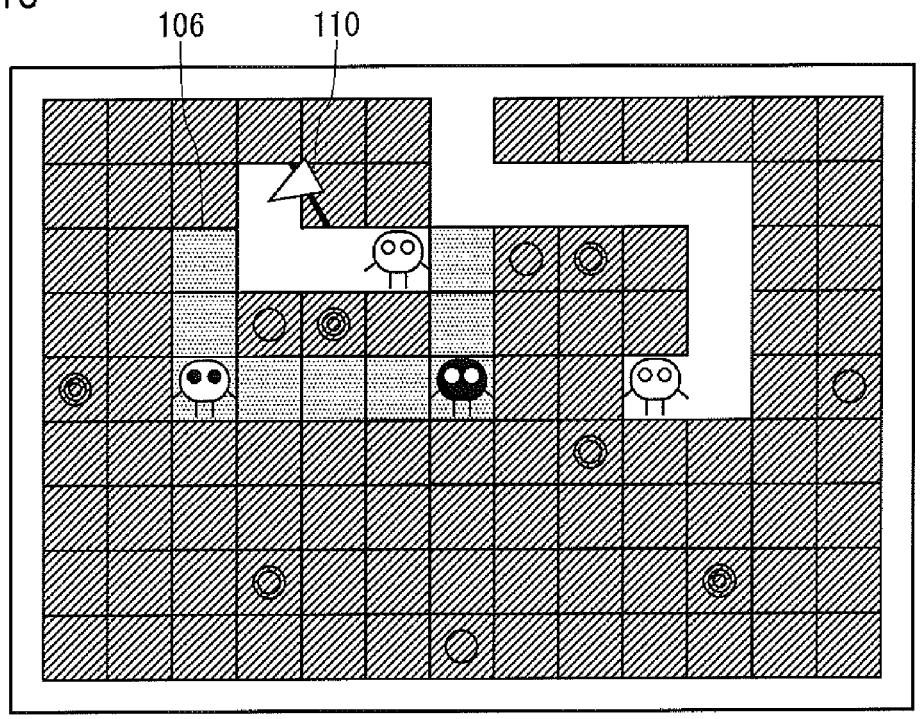
FIG. 10 shows an exemplary screen image of the game provided by the game device.

FIG. 10 shows an exemplary screen image of the game provided by the game device 10. After producing nine blocks of water at the position of the excavated block, the fluid control unit 48 moves the water to a lower position, and fill the passage with the water from the lowest position which the water can reach without climbing up from the produced position. The screen image of this process is shown in FIG. 10. The fluid control unit 48 may control the water so as a part of a block, which is positioned at the level of the water surface, is filled with the water so that the surface of the water becomes flat.

Figure 11:
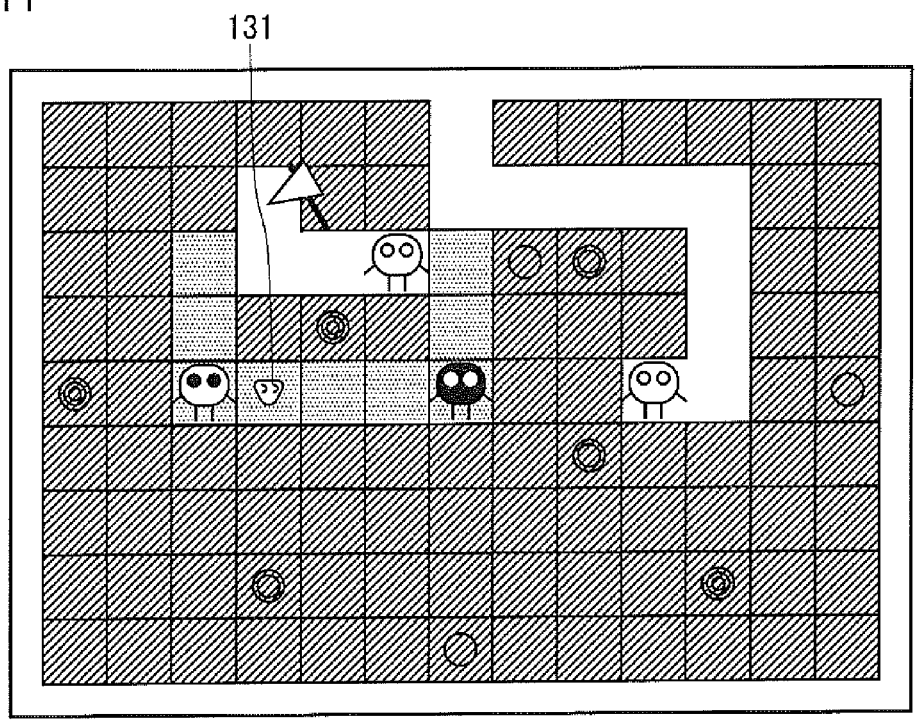
FIG. 11 shows an exemplary screen image of the game provided by the game device.

FIG. 11 shows an exemplary screen image of the game provided by the game device 10. The aquatic character control unit 45 refers to the field table 60 and in case energy more than or equal to a predetermined value is accumulated in earth adjacent to a passage in which water exists, the aquatic character control unit 45 produces an egg 131 of an aquatic character at a predetermined timing, and disposes the egg in the passage in which water exists. The screen image of this process is shown in FIG. 11.

Figure 12:
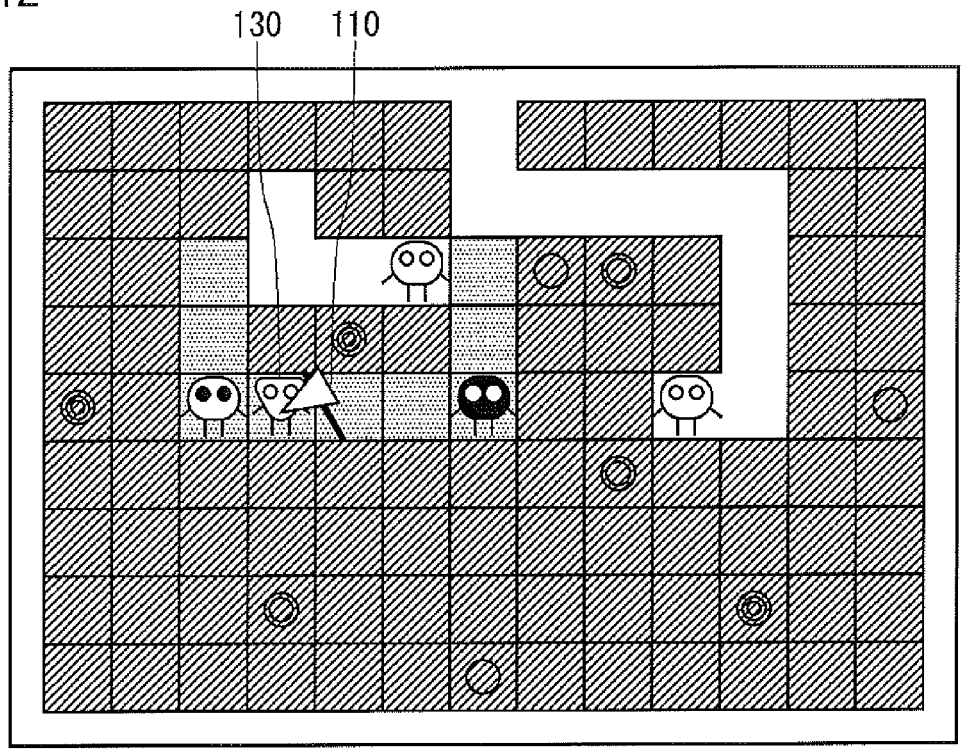
FIG. 12 shows an exemplary screen image of the game provided by the game device.

FIG. 12 shows an exemplary screen image of the game provided by the game device 10. If the user positions the cursor 110 on the egg 131 of an aquatic character and pushes the button 24, the aquatic character control unit 45 produces a first aquatic character 130 at the position of a block thereof. The screen image of this process is shown in FIG. 12.

Figure 13:
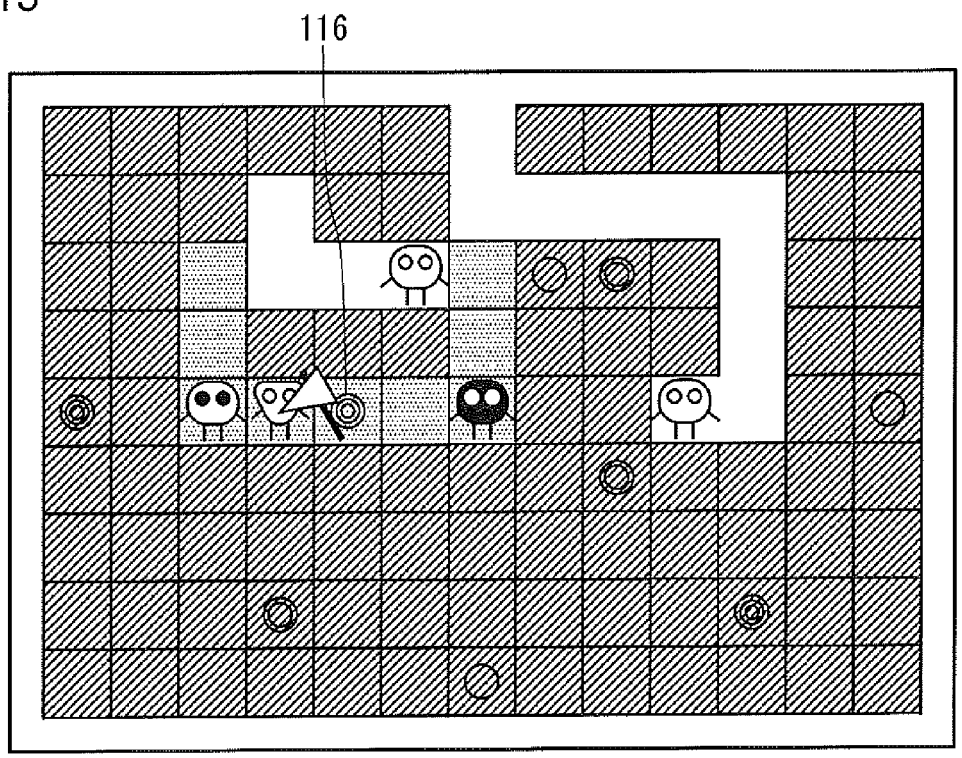
FIG. 13 shows an exemplary screen image of the game provided by the game device.

FIG. 13 shows an exemplary screen image of the game provided by the game device 10. The energy managing unit 43 moves energy accumulated in earth adjacent to a passage in which water exists to the passage in which water exists at a predetermined timing. For example at random timing, the energy managing unit 43 replaces the value of energy of a block of earth adjacent to a passage in which water exists in the energy field 72 with "0". Then the energy managing unit 43 adds the value of energy accumulated in the block to the value of energy of a block of the adjacent passage in which water exists in the energy field 72 in the field table 60. The screen image of this process is shown in FIG. 13.

Figure 14:
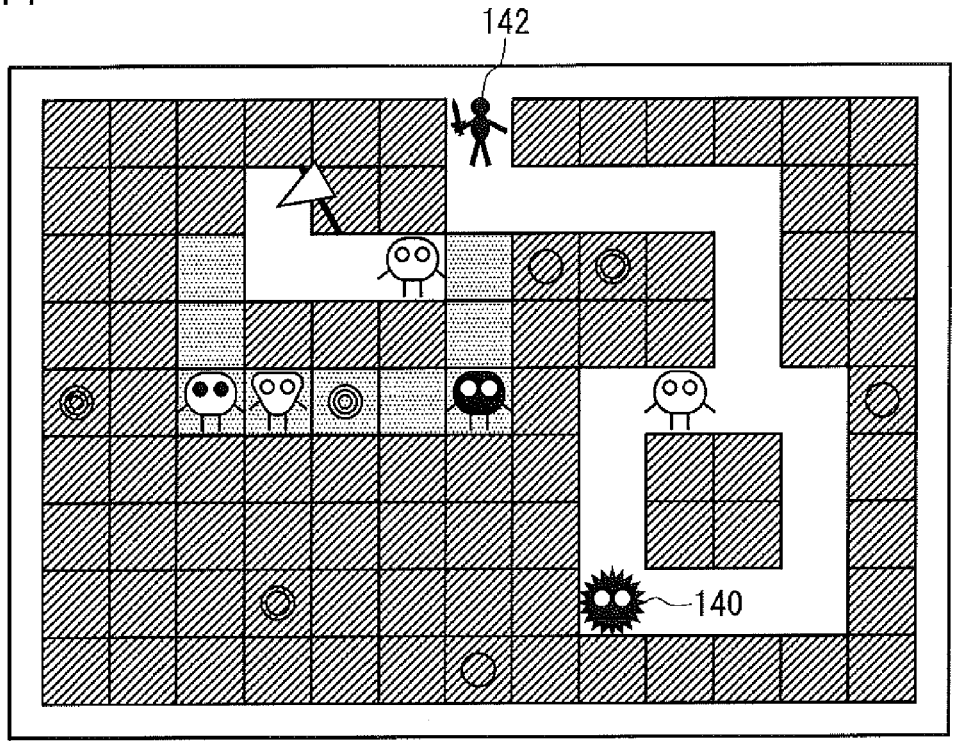
FIG. 14 shows an exemplary screen image of the game provided by the game device.

FIG. 14 shows an exemplary screen image of the game provided by the game device 10. If a predetermined time period has been passed after starting a game, the game control unit 41 notifies the user that an enemy character 142 is going to invade the game field, and sends an inquiry about the position for disposing the boss character 140 to the user. The game control unit 41 disposes the boss character 140 at the position received from the user, and enters the position in the character table 62. The boss character 140 does not move from the disposed position. The enemy character 142 is controlled by the enemy character control unit 46. The screen image of this process is shown in FIG. 14.

Figure 15:
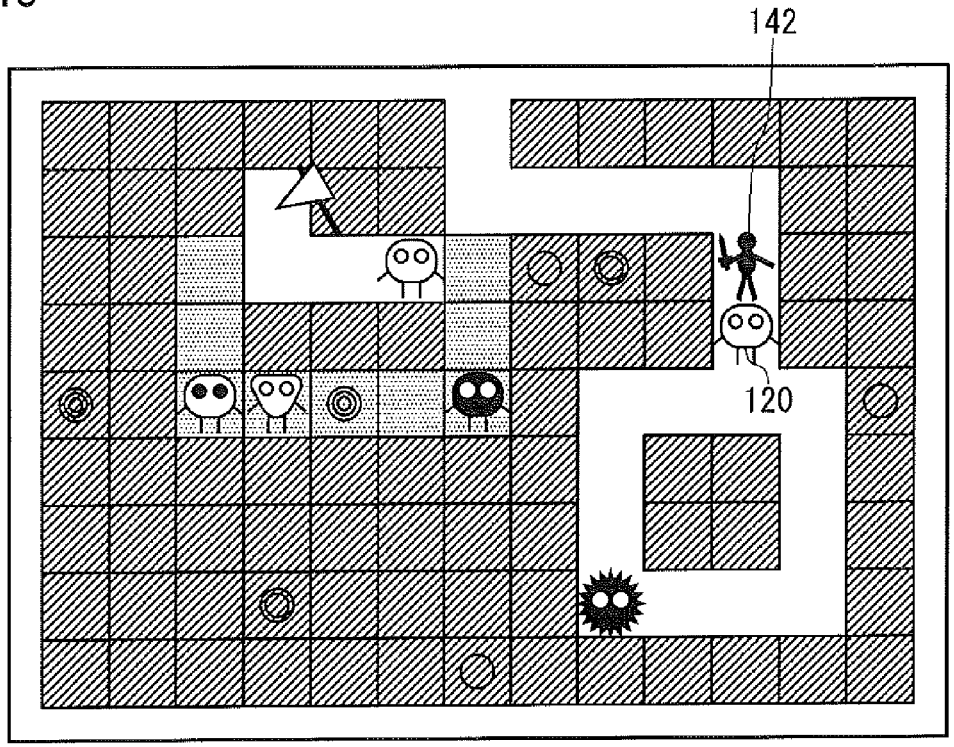
FIG. 15 shows an exemplary screen image of the game provided by the game device.

FIG. 15 shows an exemplary screen image of the game provided by the game device 10. If the enemy character 142 controlled by the enemy character control unit 46 encounters a terrestrial character controlled by the terrestrial character control unit 44 or an aquatic character controlled by the aquatic character control unit 45, combat is started by the combat control unit 47. The screen image of this process is shown in FIG. 15.

Figure 16:
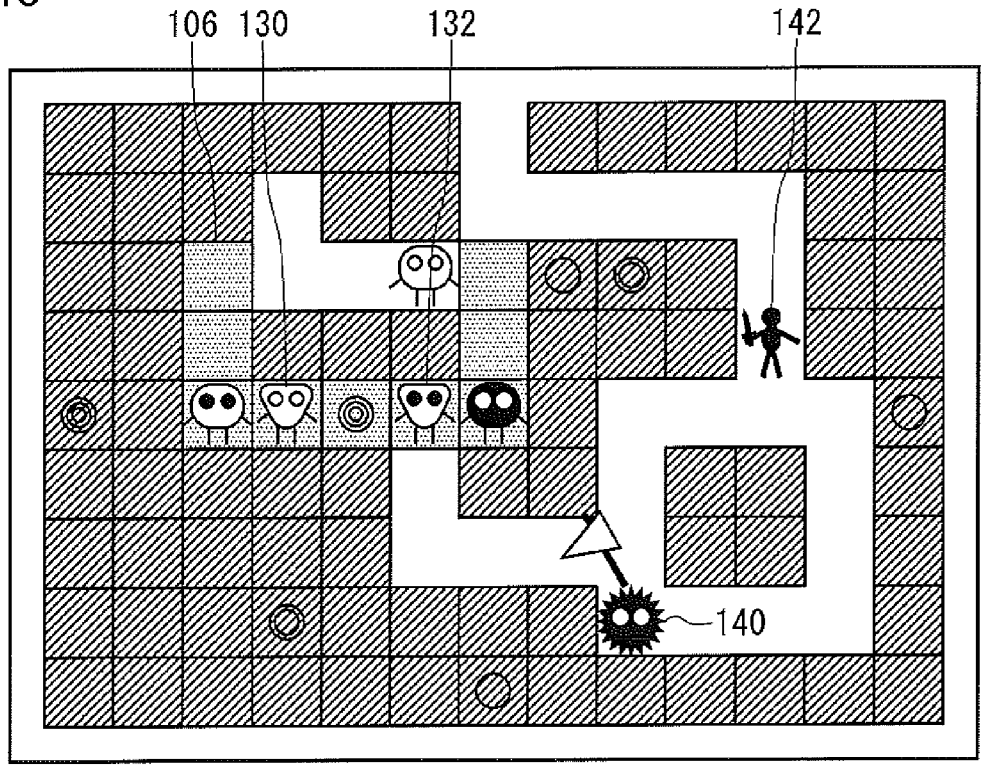
FIG. 16 shows an exemplary screen image of the game provided by the game device.

FIG. 16 shows an exemplary screen image of the game provided by the game device 10. In the game screen image shown in FIG. 15, if the terrestrial character 120 is defeated by the enemy character 142, since a character of the user does not exist between the enemy character 142 and the boss character 140, a probability that the boss character 140 is taken away by the enemy character 142 increases. Although the user can newly produce a terrestrial character from earth surrounding the boss character 140, since energy is not accumulated sufficiently in the earth surrounding the boss character 140 in the game screen image shown in FIG. 15, it is difficult to produce a terrestrial character quickly.

In this process, by excavating earth between a passage that is filled with water and is located at upper left in the game field, and a passage where the boss character 140 is disposed, and by connecting the passages by a passage, the user can move the water 106 together with aquatic characters living in the water to a space surrounding the boss character 140 that is positioned at a lower level. A screen image when excavating earth between the passage filled with water and the passage where the boss character 140 is disposed is shown in FIG. 16.

Figure 17:
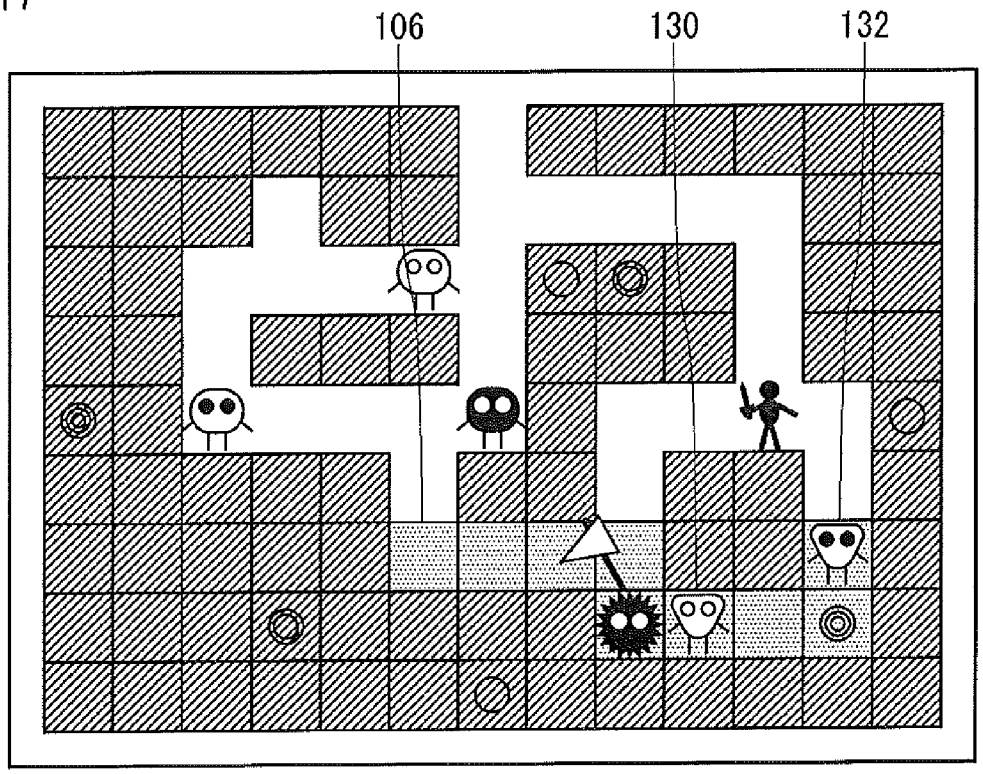
FIG. 17 shows an exemplary screen image of the game provided by the game device.

FIG. 17 shows an exemplary screen image of the game provided by the game device 10. The water 106 is moved by the fluid control unit 48. At the same time, the first aquatic character 130 and a second aquatic character 132 that have been living in the water 106 are moved together with the water 106 by the aquatic character control unit 45. The screen image of this process is shown in FIG. 17. In this manner, a user can indirectly move the characters that act autonomously and cannot be operated directly. Thereby, the user can move an aquatic character to a space surrounding the boss character 140 and allows the aquatic character to combat the enemy character 142.

Figure 18:
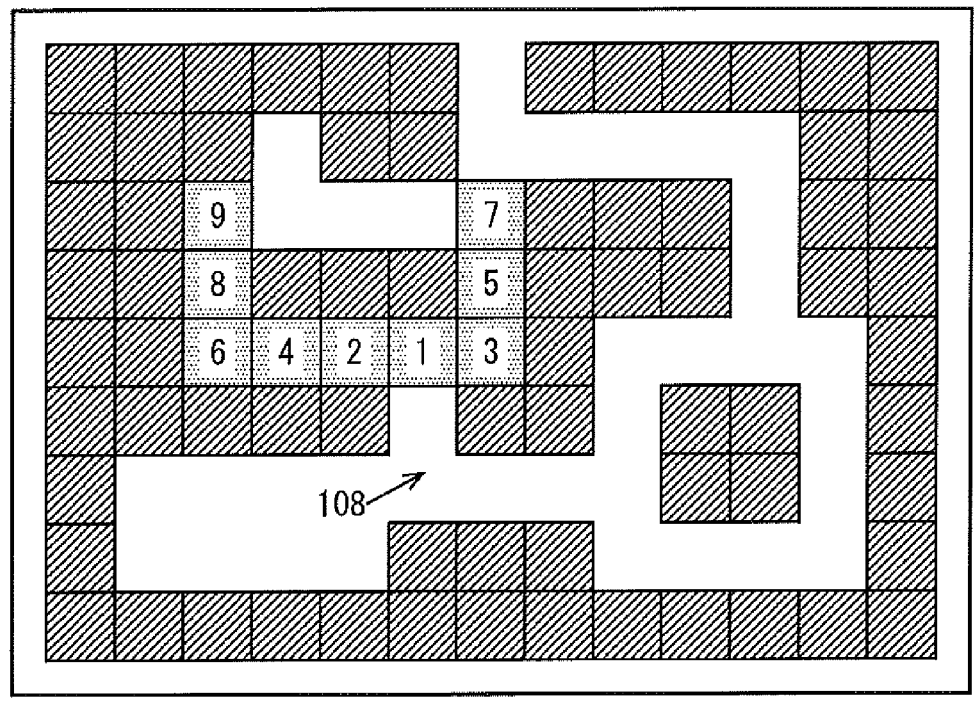
FIG. 18 is a diagram that illustrates an algorithm that controls the flow of fluid.
Figure 19:
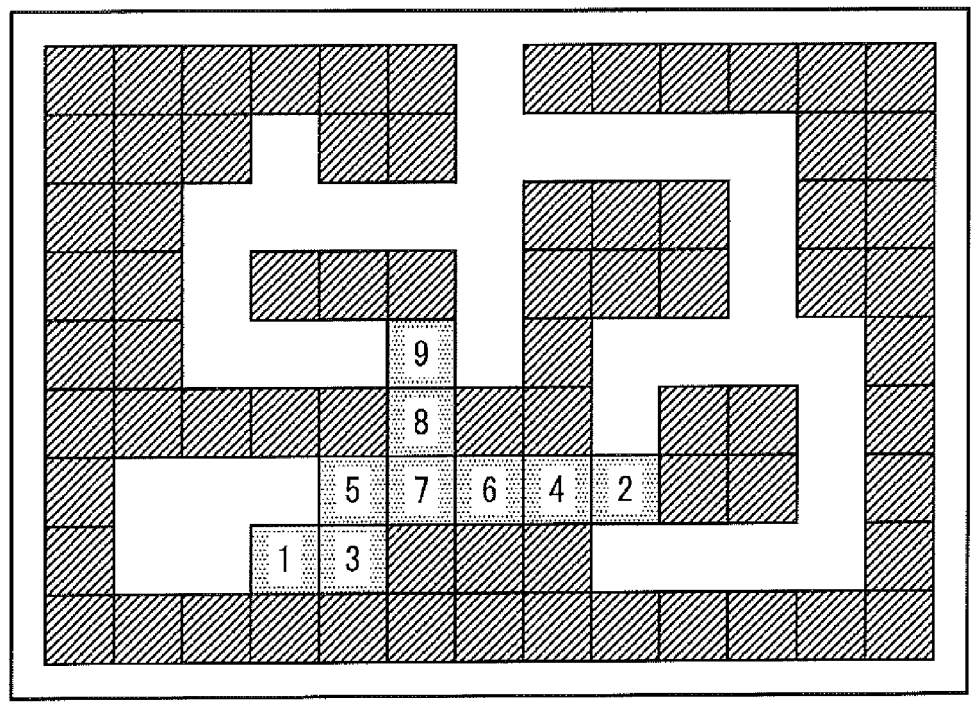
FIG. 19 is a diagram that illustrates the algorithm that controls the flow of fluid.
Figure 20:
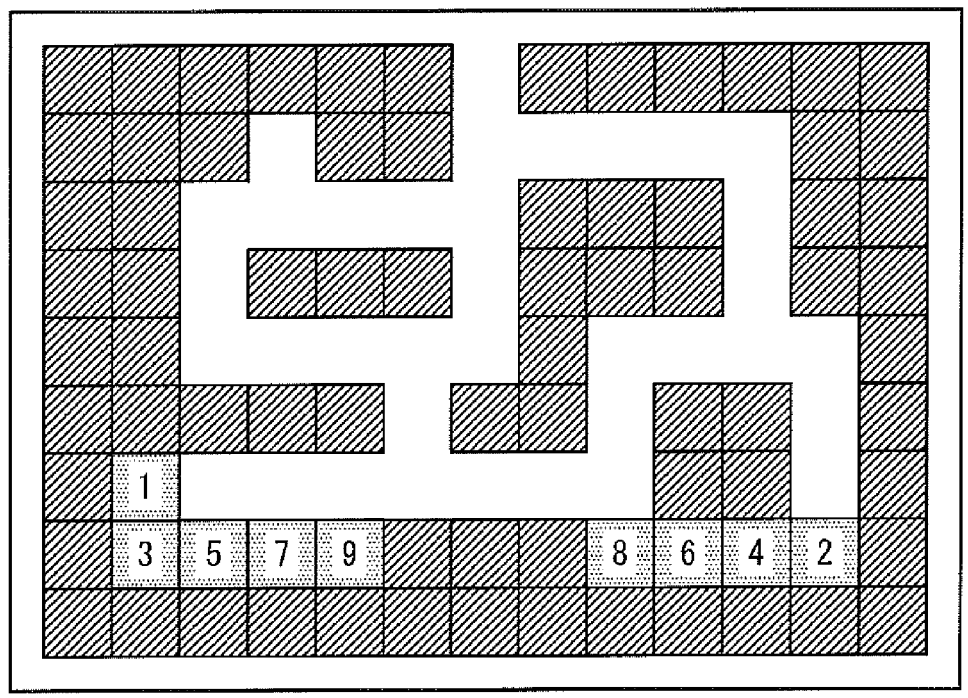
FIG. 20 is a diagram that illustrates the algorithm that controls the flow of fluid.

FIG. 18-20 are diagrams that illustrate an algorithm that controls the flow of fluid. As shown in FIG. 18, the fluid control unit 48 allocates numbers to blocks in the order corresponding to the length of respective routes from a position where water falls, the order starting from a block of which the route is the shortest, and manages the movement of water. For blocks, of which routes from the position where water falls have same length, the fluid control unit 48 allocates a smaller number, for example, to a block located at left. Although the fluid control unit 48 moves water in the order starting from a smaller number to a larger one, in case that a route through which water flows branches, the fluid control unit 48 moves water to left and right alternately. For example, at a junction 108 in the game field shown in FIG. 18, the fluid control unit 48 first moves water of number 1 to left, next water of number 2 to right, then water of number 3 to left, and so on. Therefore, the status of water changes via a status shown in FIG. 19 and ultimately to a status shown in FIG. 20.

Figure 21:
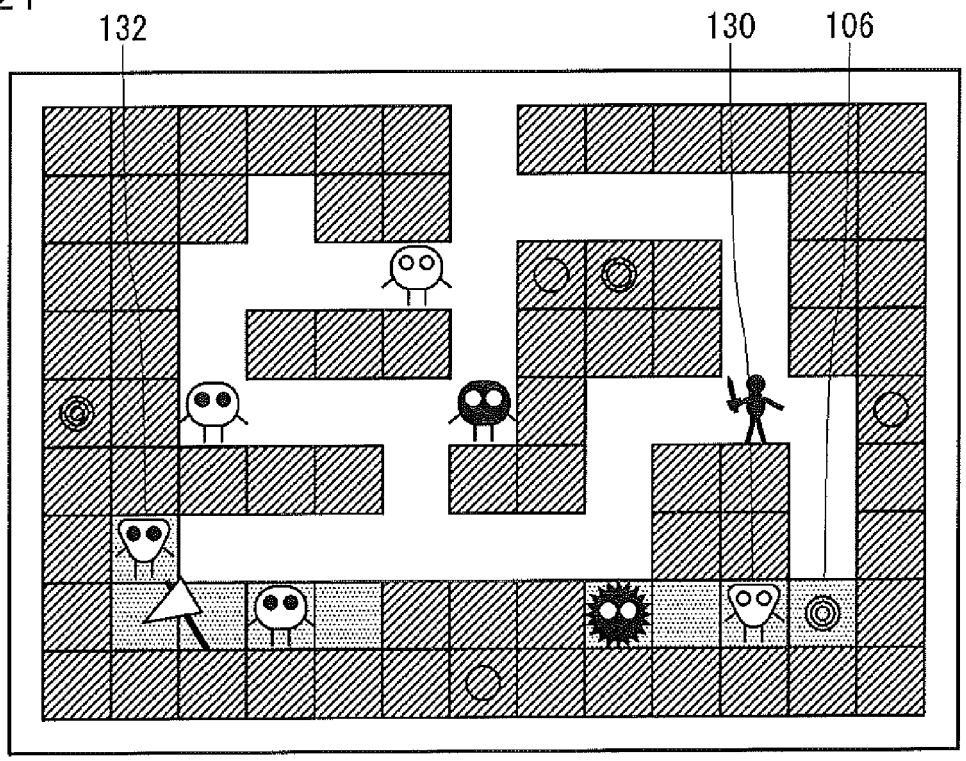
FIG. 21 shows an exemplary screen image of the game provided by the game device.

FIG. 21 shows an exemplary screen image of the game provided by the game device 10. In the game screen image shown in FIG. 16, in case a passage is formed as shown in FIG. 15, the water is moved by the fluid control unit 48 and aquatic characters are moved by the aquatic character control unit 45, which results in a status shown in FIG. 21. The second aquatic character 132 that has existed at the position of water of number 1, moves to a left branch with the water of number 1. The first aquatic character 130 that has existed at the position of water of number 4, moves to a right branch with the water of number 4.

Second Embodiment

In the second embodiment, an explanation will be given on a game mode where a plurality of players play the game explained in the first embodiment. According to the embodiment, an explanation will be given on a game with which users can cooperate to make the game proceed, and users can also combat with each other. However, the word "combat" is used also in case users cooperate to make the game proceed, for the convenience of explanation. In addition, an explanation will be given on an example where two players play against each other, a similar explanation also applies to a case where more than two players play against each others.

Figure 22:
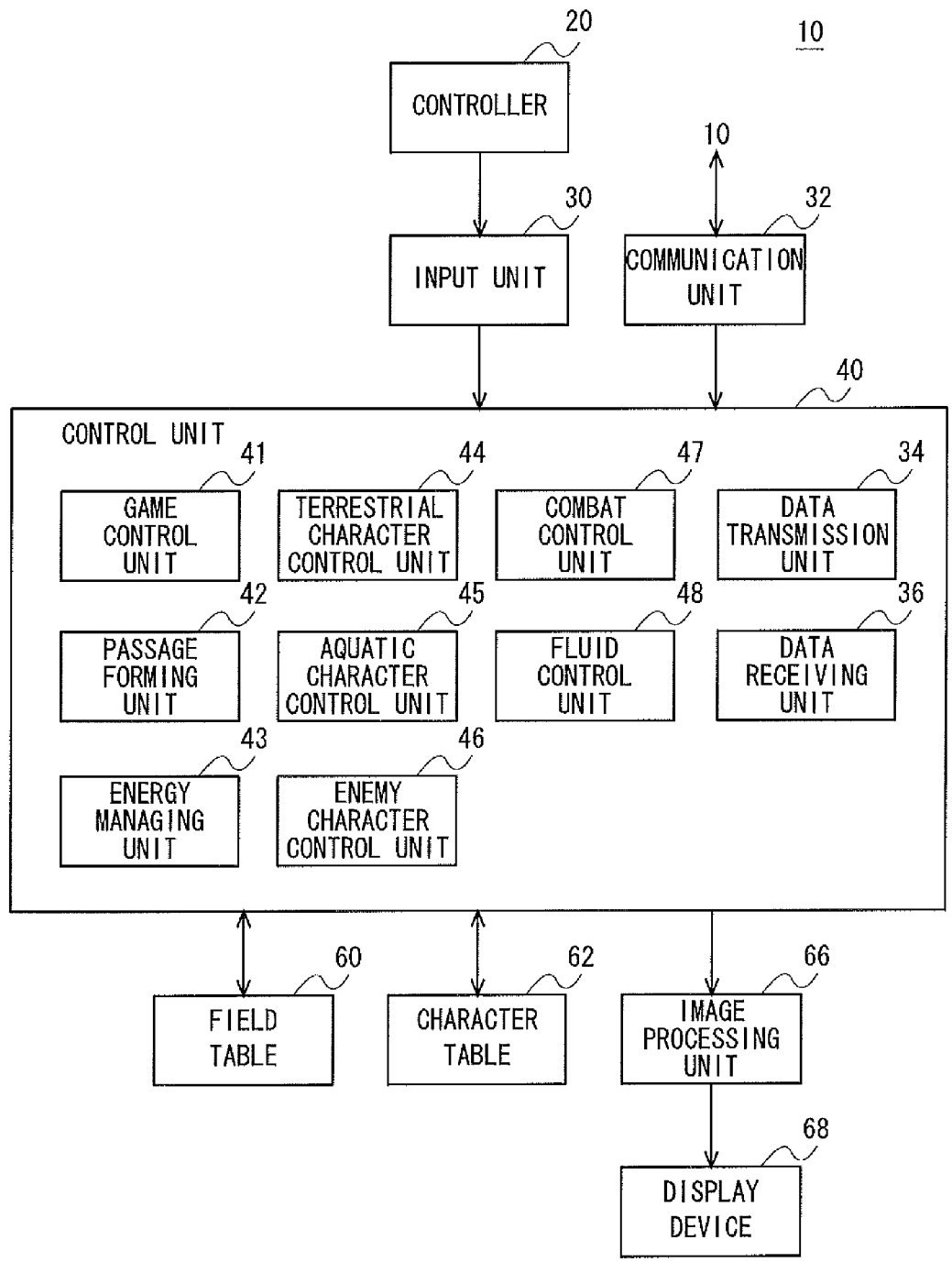
FIG. 22 shows a structure of a game device according to a second embodiment.

FIG. 22 shows a structure of a game device 10 according to the second embodiment. The game device 10 according to the second embodiment comprises a communication unit 32, a data transmission unit 34, and a data receiving unit 36, in addition to the constituent elements of the game device 10 according to the first embodiment shown in FIG. 1. The communication unit 32 transmits data to and receives data from a game device 10 of an opponent player. The communication unit 32 may communicate with the game device 10 of the opponent player directly, or may communicate with the game device 10 of the opponent player via a server that manages transmission and reception of data between game devices.

Figure 23:
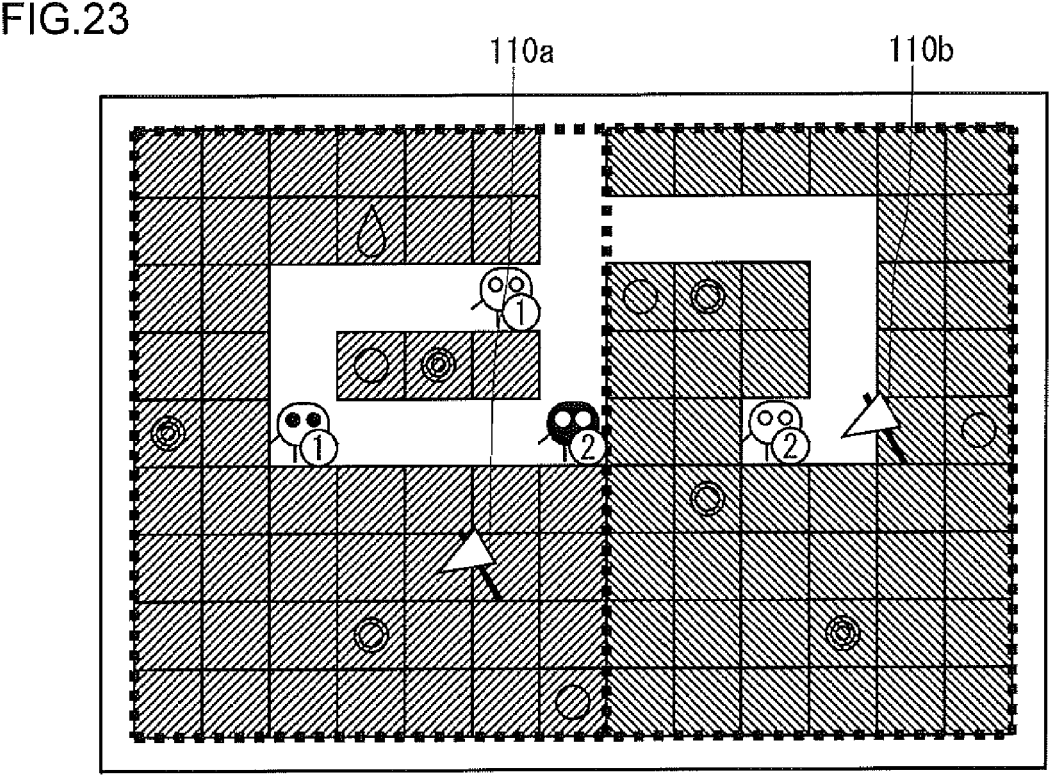
FIG. 23 shows an exemplary screen image of the game provided by the game device according to the second embodiment.

FIG. 23 shows an exemplary screen image of a game according to the second embodiment. A game field is divided into areas, by the number of game devices that participate in the game, e.g., two in FIG. 23. A left half area is allocated to a player 1P and a right half area is allocated to a player 2P. The player 1P controls a cursor 110a, and the player 2P controls a cursor 110b. Each of the players excavates mainly a game field which the player takes charge of, produces a character, and propagates the produced character. A player can excavate a game field which the other player takes charge of. However, in case a character is produced from excavated earth, the character does not belong to the player who has excavated the earth but belongs to the player who takes charge of the game field. On each character, information for identifying a player to which the character belongs (for example, the ID of the player, or the like) may be displayed as shown in FIG. 23.

The game field which the player 1P takes charge of and the game field which the player 2P takes charge of are connected by a passage. Therefore, a character that belongs to the player 1P can move to the game field that belongs to the player 2P, and a character that belongs to the player 2P can move to the game field that belongs to the player 1P. In addition, a player can also excavate and form a passage connecting: a passage that the player has excavated and formed in the game field that the player takes charge of; and a passage in the game field that the other player takes charge of. Thereby, the player can send a character, which the player himself/herself has produced in the game field that the player takes charge of, to the game field that the other player takes charge of.

If a predetermined time period has been passed after starting a game, the game control unit 41 disposes a boss character and an enemy character in the game field, in a similar manner as that of the first embodiment. The game control unit 41 makes all players who participate in the game to dispose a boss character of the player in the game field that the player himself/herself takes charge of. If all the enemy characters disposed in the game field are defeated by one or more characters that belong to any one of the players, respectively, the game control unit 41 gives points to respective players to whom the characters that have defeated the enemy character belong, and terminates the game. If all boss characters are took away from the game field by an enemy character, the game control unit 41 determines that the game is over. Even if a boss character belonging to any one of the players is took away from the game field by an enemy character, if all enemy characters are demolished in a predetermined time period, the game may be determined to be cleared.

Figure 24:
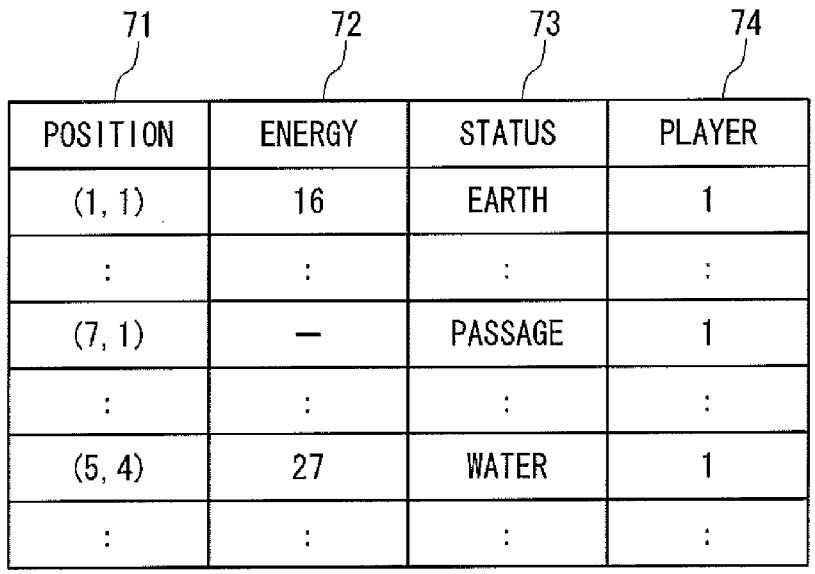
FIG. 24 shows an example of internal data of a field table according to the second embodiment.

FIG. 24 shows an example of internal data of a field table 60 according to the second embodiment. The field table 60 according to the second embodiment is provided with a player field 74 in addition to the internal data of the field table 60 according to the first embodiment. The player field 74 stores the ID of a player of a game device 10 to which a block of a game field belongs.

Figure 25:
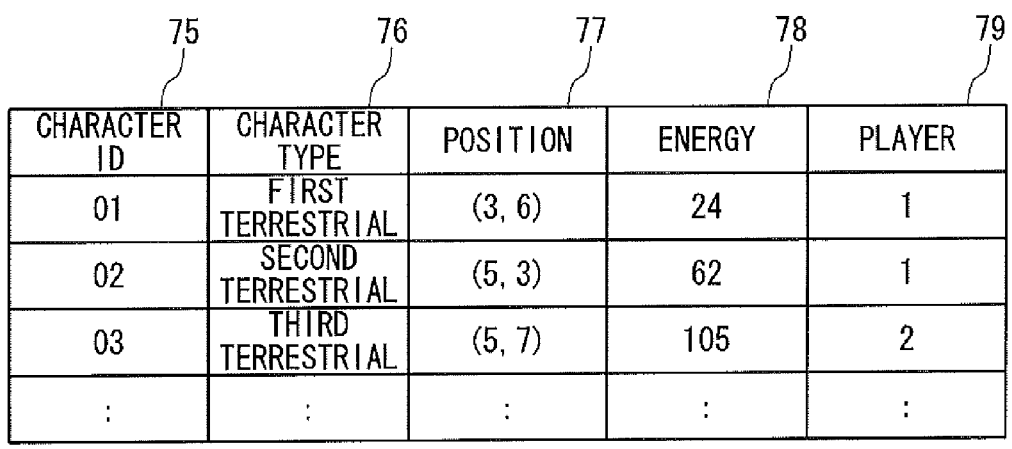
FIG. 25 shows an example of internal data of a character table according to the second embodiment.

FIG. 25 shows an example of internal data of a character table 62 according to the second embodiment. The character table 62 according to the second embodiment is provided with a player field 79 in addition to the internal data of the character table 62 shown in FIG. 5. The player field 79 stores the ID of a player to whom a character belongs.

An explanation on the structure of each element will be continued while referring back to FIG. 22. At a predetermined timing, a data transmission unit 34 generates data to be transmitted to a game device 10 of an opponent player and transmits the data to the game device 10 of the opponent player via the communication unit 32. For example, the data transmission unit 34 may transmit data every time the image processing unit 66 generates one frame of game screen image, or may transmit data for every certain number of frames more than one. The data transmission unit 34 may transmit a control signal that the input unit 30 has received from the controller 20, or details of an operation instruction input via the controller 20, to the game device 10 of the opponent player. Alternatively, the data transmission unit 34 may transmit a parameter indicating the status of the game of the device thereof, for example, the contents of the field table 60 and the character table 62. In the latter case, the data transmission unit 34 may extract a parameter required by the game device 10 of the opponent player from the field table 60 and the character table 62, and may transmit the parameter accordingly, or may extract and transmit only a changed parameter.

In a game according to the embodiment, a movement of a cursor or an excavation of earth can be reproduced in the game device 10 of the opponent player by acquiring details of an operation instruction input via the controller 20. Therefore, in case that: a) Neither an action and/or growth of each character, nor a change of energy accumulated in a game field and/or a character has a random factor; and b) a plurality of game devices 10 participating in the game are controlled by a same algorithm, a same status can be reproduced in each of the game devices 10 by sharing an operation input via controllers of respective game devices 10. In this case, an initial parameter of the game (e.g., information on the distribution of earth or energy in a game field, or the like) is shared by game devices when the game is started, and after that, an operation input via a controller 20 is shared by the game devices. In case that a random factor is applied to an action or growth of each character, and/or to a change in energy accumulated in a game field or a character, a parameter indicating a status or a change in each device is needed to be transmitted to and received from among the devices in order to reproduce a same status in the plurality of game devices 10.

The data receiving unit 36 receives data transmitted from a game device 10 of an opponent player via the communication unit 32. In case of acquiring an operation instruction input via the controller 20 of another game device 10, the data receiving unit 36 notifies respective constituting elements in the control unit 40 of the information, and in accordance with the operation instruction, allows the control unit 40 to reproduce a status, which should be realized in the other game device 10. For example, in case an input via the directional keys 21 has been made, the data receiving unit 36 allows the passage forming unit 42 to move a cursor of a game field belonging to a player of the game device including the directional keys 21, and in case an input via the button 24 has been made, the data receiving unit 36 allows the passage forming unit 42 to excavate earth at a current position of the cursor so as to form a passage.

In case of acquiring a parameter indicating the status of the game or the change in the status of the game in another game device 10, the data receiving unit 36 notifies respective constituting elements in the control unit 40 of the information, and allows the control unit 40 to reproduce a status, which is realized in the other game device 10. For example, in case of acquiring a parameter indicating that a character has moved, the data receiving unit 36 allows the terrestrial character control unit 44 or the aquatic character control unit 45 to move the character.

The passage forming unit 42 moves a cursor, excavates earth constituting a game field so as to form a passage, in accordance with an operation instruction input via the controller 20 of the device thereof in a similar manner as that of the first embodiment. The passage forming unit 42 manages the increase and the decrease of a parameter required for excavating earth and forming a passage. When excavating earth and forming a passage in an area allocated to a player of another device, the passage forming unit 42 subtracts a value from a current value of the parameter, wherein the value to be subtracted is larger than a value to be subtracted for a case of excavating earth and forming a passage in an area allocated to a player of the own device. Thereby, while enabling the formation of a passage in an area allocated to another player, setting a large compensation for the formation inhibits excessive interference to an area of other player, and enables an appropriate adjustment of the degree of difficulty and/or the entertainment experience of the game.

When a passage is formed by the passage forming unit 42, if energy equal to or more than the first level is accumulated in earth at the excavated position, the terrestrial character control unit 44 produces a terrestrial character in accordance with the value accumulated energy. In this process, the terrestrial character control unit 44 enters, in the character table 62, information on the produced terrestrial character and the ID of a player who takes charge of a game field to which the excavated earth belongs. Hereafter, the produced terrestrial character is controlled by the terrestrial character control unit 44 of a game device 10 of a player to whom the character belongs.

If the button 24 acknowledges an input when a cursor is on a block where an egg of an aquatic character is disposed, the aquatic character control unit 45 produces an aquatic character. In this process, the aquatic character control unit 45 enters, in the character table 62, information on the produced aquatic character and the ID of a player who takes charge of a game field to which the earth as the source of the egg belongs. Hereafter, the produced aquatic character is controlled by the aquatic character control unit 45 of the game device 10 of a player to whom the character belongs.

If a character which a terrestrial character or an aquatic character can catch and eat exists in a block adjacent to a block in which a terrestrial character or an aquatic character exists, the terrestrial character control unit 44 and the aquatic character control unit 45 determine that the character can be caught and eaten even if the character does not belong to the same player to whom the terrestrial character or the aquatic character belongs. That is, a player can breed, not only in his/her own game field, a character having been produced in his/her own game field, but can also move the character through a passage to a game field belonging to another player and can allow the character to catch and eat a character, which exists in a surrounding area and which belongs to the other player, so as to breed.

According to such a strategy, a player can breed his/her own character by using energy accumulated in a game field belonging to another player, thus the player can make the game proceed more advantageously. However, when the energy of the character falls blow a predetermined value and the character vanishes, the energy of the character is given to a surrounding game field. Therefore, there is a possibility that energy of own game field moves to another player's game field, as a result. In this manner, a player has to make the game proceed while considering novel factors that have not existed up to now, which can give the player enjoyment of thinking about a new strategy.

Figure 26:
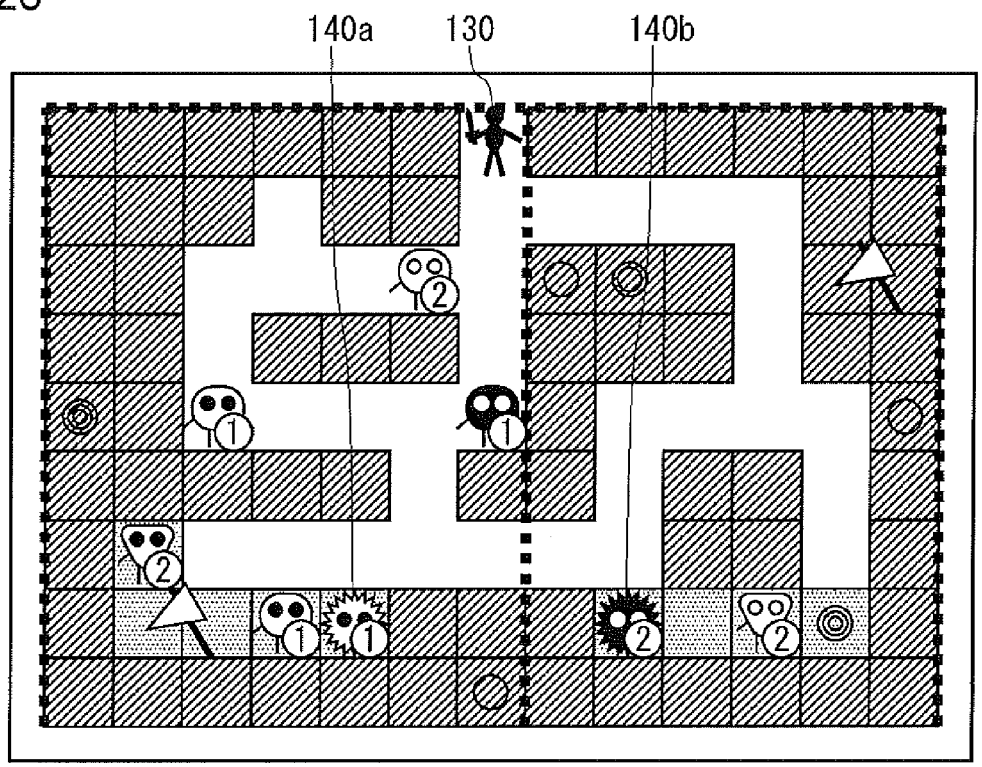
FIG. 26 shows an exemplary screen image of the game provided by the game device according to the second embodiment.

FIG. 26 shows an exemplary screen image of the game according to the second embodiment. If a predetermined time period has been passed after starting a game, the game control unit 41 notifies players that an enemy character 142 is going to invade the game fields, and issues inquiry about a position for disposing the boss character 140 to the players. The game control unit 41 disposes the boss characters 140a and 140b at positions received from respective players, and enters the positions in the character table 62. The enemy character 142 is controlled by the enemy character control unit 46 of a game device 10 that hosts the game among the game devices 10 participating the game. The action of an enemy character is notified from the game device 10 hosting the game to other game devices 10.

The enemy character control unit 46 moves the enemy character so that the enemy character passes through only passages that had been already formed when the enemy character was disposed. Although an enemy character does not move through a passage that is formed after the enemy character is disposed, other characters can move through the passage. Therefore, a player can produce a character or can allow a character to move by forming a passage even after an enemy character is disposed. By allowing water supplied in a passage to move, a user can move characters together with the water as explained in the first embodiment.

If an enemy character is defeated by a character that belongs to any one of the players, the game control unit 41 gives a bonus point to a player to whom the character that has defeated the enemy character belongs. Therefore, if a user brings an enemy character in the user's own field, and makes the enemy character to combat the user's own character, a probability of acquiring a bonus point increases. However in this case, a probability that the user's boss character is taken away by the enemy character also increases, by contrast. In addition, there is also a possibility that the enemy character moves to another player's game field, since players can not control which passage an enemy character moves through. In that case, by forming a passage connecting a game filed to which the enemy character has moved and the user's own game field, the user can move his/her own character to the game field where the enemy character exists and can allow the own character to combat the enemy character.

The game device 10 may provide a function for controlling a direction in which an enemy character moves, and/or a function for changing a position for disposing an enemy character and/or a boss character.

Given above is an explanation based on the exemplary embodiments. These embodiments are intended to be illustrative only and it will be obvious to those skilled in the art that various modifications to constituting elements and processes could be developed and that such modifications are also within the scope of the present invention.

Although in the embodiments, an explanation has been made on an example wherein the game field is two-dimensional, the game field may also be three-dimensional. Further, although in the embodiments an explanation has been made on an example wherein a game field is divided into rectangular blocks and managed, the game field may be rendered by providing two-dimensional or three-dimensional configuration data of, for example, geographic features, character, or the like. Further in the embodiments, as an algorithm that controls the flow of water, an explanation has been made on an example wherein water is moved block by block, as a unit for movement. However, the flow of water may also be controlled by a simulation using a physical calculation.

DESCRIPTION OF THE REFERENCE NUMERALS 10 game device, 20 controller, 30 input unit, 32 communication unit, 34 data transmission unit, 36 data receiving unit, 40 control unit, 41 game control unit, 42 passage forming unit, 43 energy managing unit, 44 terrestrial character control unit, 45 aquatic character control unit, 46 enemy character control unit, 47 combat control unit, 48 fluid control unit, 60 field table, 62 character table, 66 image processing unit, 68 display device.

The present invention is applicable to game devices that make a game progress by moving a character.

The invention claimed is:

1. A non-transitory computer-readable recording medium encoded with a program comprising:
an allocating module configured to divide a game field into areas by the number of game devices that participate in a game, and configured to allocate each area to a respective one of the game devices, each game device being operated by a respective player;
a character producing module configured to, if a predetermined condition is satisfied by one of the players in the game field during progress of the game after a start of the game, produce a character belonging to one of the game devices, the predetermined condition being a gamey achievement condition;
a defining module configured to define that, when the predetermined condition has been satisfied by a player, playing in an area of the game field allocated to a game device being operated by another player, of a game device to which the area of the game field where the character has been produced was not allocated, the character belongs to the game device to which the area of the game field where the character has been produced was allocated;
a combat control module configured to control combat between the character and an enemy character; and
a profit supplying module configured to, when the character defeats the enemy character, supply profit to the player of the game device to which the character belongs.

2. The medium according to claim 1, the program further comprising:
a character action control module configured to control an action of the character in the game field, wherein
the character action control module defines that the character can move to an area allocated to a player of another game device.

3. The medium according to claim 1, the program further comprising a passage forming module configured to form a passage in the game field through which the character can move, in accordance with an instruction by a player.

4. The medium according to claim 3, the program further comprising a parameter managing module configured to manage the increase and the decrease of parameters that are necessary to form the passage, and configured, when forming the passage in an area allocated to a player of another device, to subtract a value from the parameter, the value being larger than a value for a case of forming a passage in an area allocated to the player of the own device.

5. The medium according to claim 1, wherein the character is a protagonist character.

6. A game device comprising:
a field table operative, when a game field is divided into areas by the number of game devices that participate in a game, to allocate each area to a respective one of the game devices, each game device being operated by a respective player, and to store each area and its respective game device in association with each other;
a character control unit operative to, if a predetermined condition is satisfied by one of the players in the game field during progress of the game after a start of the game, operative to, produce a character belonging to one of the game devices, the predetermined condition being a gameplay achievement condition, and operative to refer to the field table, and operative to define that, when the predetermined condition has been satisfied by a player, playing in an area of the game field allocated to a game device being operated by another player, of a game device to which the area of the game field where the character has been produced was not allocated, the character belongs to the game device to which the area of the game field where the character has been produced was allocated;
a combat control unit operative to control combat between the character and an enemy character; and
a game control unit operative, when the character defeats the enemy character, to supply profit to the player of the game device to which the character belongs.

7. A method for controlling a game comprising:
dividing a game field into areas by the number of game devices that participate in the game, and allocating each area to a respective one of the game devices, each game device being operated by a respective player;
if a predetermined condition is satisfied by one of the players in the game field during progress of the game after a start of the game, producing a character belonging to one of the game devices, the predetermined condition being a gameplay achievement condition;
defining that, when the predetermined condition has been satisfied by a player, playing in an area of the game field allocated to a game device being operated by another player, of a game device to which the area of the game field where the character has been produced was not allocated, the character belongs to the game device to which the area of the game field where the character has been produced was allocated;
controlling combat between the character and an enemy character; and
when the character defeats the enemy character, supplying profit to the player of the game device to which the character belongs.

8. A non-transitory computer-readable medium encoded with a program comprising:

an allocating module configured to divide a game field into areas by the number of game devices that participate in a game, and configured to allocate respective areas to players of respective game devices;

a character producing module configured to produce a character if a predetermined condition is satisfied in the game field;

a defining module configured to define that the produced character belongs to a game device of a player to whom an area of the game field where the character has been produced is allocated;

a combat control module configured to control combat between the character and an enemy character; and a profit supplying module configured, when the character defeats the enemy character, to supply profit to a player of a game device to which the character belongs;

the program further comprising a parameter managing module configured to manage the increase and the decrease of parameters that are necessary to form a passage, and configured, when forming the passage in an area allocated to a player of another device, to subtract a value from the parameter, the value being larger than a value for a case of forming a passage in an area allocated to the player of the own device.

9. A non-transitory computer-readable recording medium encoded with a program comprising:

an allocating module configured to divide a game field into areas by the number of game devices that participate in a game, and configured to allocate respective areas to players of respective game devices;

a character producing module configured to produce a character if a predetermined condition is satisfied in the game field;

a defining module configured to define that, when at least one other player has contributed to the satisfaction of the predetermined condition, the produced character belongs to a game device of a player to whom an area of the game field where the character has been produced is allocated;

a combat control module configured to control combat between the character and an enemy character; and a profit supplying module configured, when the character defeats the enemy character, to supply profit to a player of a game device to which the character belongs;

wherein the program further comprises a passage forming module configured to form a passage in the game field through which the character can move, in accordance with an instruction by a player; and wherein the program further comprises a parameter managing module configured to manage the increase and the decrease of parameters that are necessary to form the passage, and configured, when forming the passage in an area allocated to a player of another device, to subtract a value from the parameter, the value being larger than a value for a case of forming a passage in an area allocated to the player of the own device.

* * * * *